United States Patent
Fang et al.

(10) Patent No.: US 8,677,204 B2
(45) Date of Patent: Mar. 18, 2014

(54) METHODS AND APPARATUS FOR TRANSMITTING/RECEIVING DATA IN A COMMUNICATION SYSTEM

(75) Inventors: Yu-Chuan Fang, Yilan (TW); Ren-Jr Chen, Sanchong (TW)

(73) Assignee: Industrial Technology Research Institute, Hsinchu (TW)

( * ) Notice: Subject to any disclaimer, the term of this patent is extended or adjusted under 35 U.S.C. 154(b) by 1292 days.

(21) Appl. No.: 12/434,868

(22) Filed: May 4, 2009

(65) Prior Publication Data

US 2009/0276671 A1 Nov. 5, 2009

Related U.S. Application Data

(60) Provisional application No. 61/071,550, filed on May 5, 2008.

(51) Int. Cl.
*G08C 25/02* (2006.01)
(52) U.S. Cl.
USPC .......................................................... 714/748
(58) Field of Classification Search
USPC .......................................................... 714/748
See application file for complete search history.

(56) References Cited

U.S. PATENT DOCUMENTS

| | | | |
|---|---|---|---|
| 6,769,085 B2 | 7/2004 | Von Elbwart et al. | |
| 6,798,846 B2 | 9/2004 | Von Elbwart et al. | |
| 7,227,904 B2 | 6/2007 | Von Elbwart et al. | |
| 7,280,606 B2 | 10/2007 | Kim et al. | |
| 2003/0072292 A1 | 4/2003 | Yoon et al. | |
| 2003/0081576 A1* | 5/2003 | Kim et al. | 370/335 |
| 2004/0218684 A1* | 11/2004 | Golitschek Edler Von Elbwart et al. | 375/261 |
| 2007/0268814 A1* | 11/2007 | Li | 370/207 |
| 2010/0211842 A1* | 8/2010 | Moon et al. | 714/748 |

FOREIGN PATENT DOCUMENTS

| | | | | |
|---|---|---|---|---|
| EP | 1 313 247 A1 | 5/2003 | | |
| GB | 2382284 A | * 5/2003 | | H04L 1/18 |
| GB | 2445033 A | * 6/2008 | | H04L 27/26 |
| WO | WO 2007149047 A1 | * 12/2007 | | |

OTHER PUBLICATIONS

Beh, Kian Chung, et al., "Performance Evaluation of Hybrid ARQ Schemes of 3GPP LTE OFDMA System", The 18th Annual IEEE International Symposium on Personal, Indoor and Mobil Radio Communications (PIMRC '07) (2007).

Panasonic, "Enhanced HARQ Method with Signal Constellation Rearrangement", TSG-RAN Working Group 1 Meeting #19, Feb. 27-Mar. 2, 2001, Las Vegas, USA.

Hamiti, Shkumbin, "IEEE 802.16m System Description Document [Draft]", IEEE 802.16 Broadband Wireless Access Working Group, IEEE 802.16m-08/003r6, Dec. 12, 2008.

* cited by examiner

*Primary Examiner* — Michael Maskulinski
*Assistant Examiner* — Neil Miles
(74) *Attorney, Agent, or Firm* — Finnegan, Henderson, Farabow, Garrett & Dunner, LLP

(57) ABSTRACT

A method of error control, including forming a plurality of first data symbols from a plurality of data bits, transmitting a first signal including the plurality of first data symbols, receiving a request for retransmission, forming a plurality of second data symbols from the plurality of data bits, and transmitting a second signal including the plurality of second data symbols. At least one of the first data symbols is formed from several of the plurality of data bits such that none of the second data symbols is formed from the several of the plurality of data bits.

31 Claims, 46 Drawing Sheets

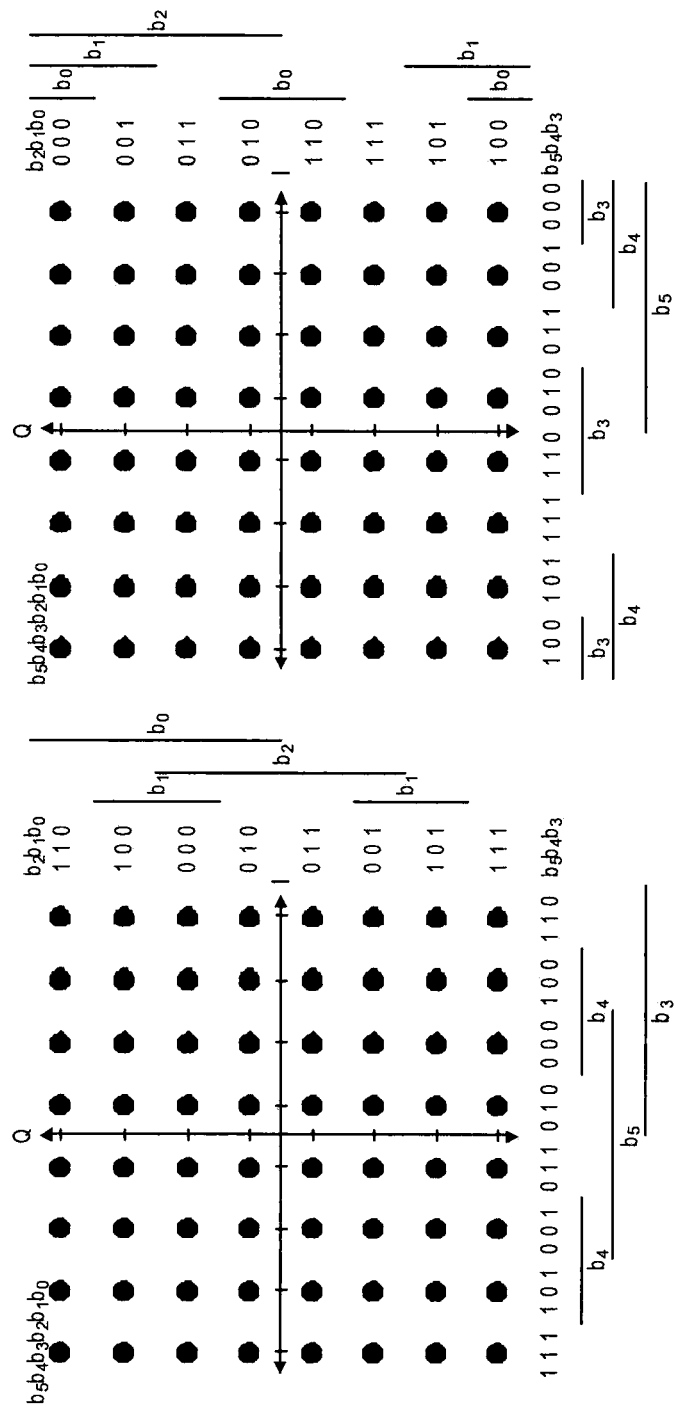

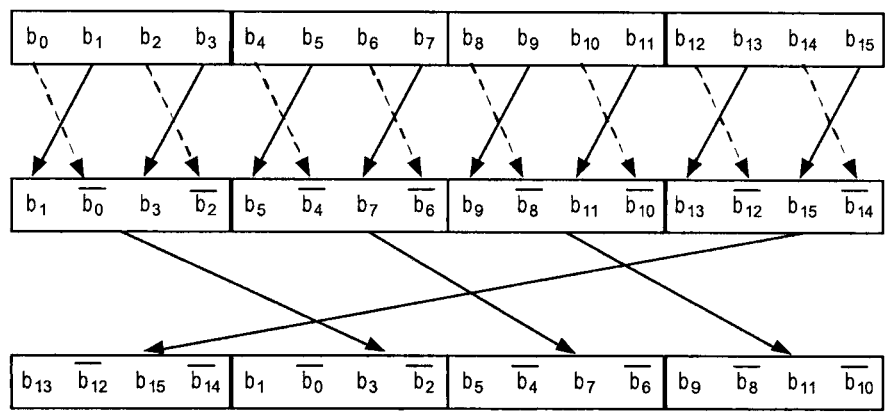
Figure 11(a)
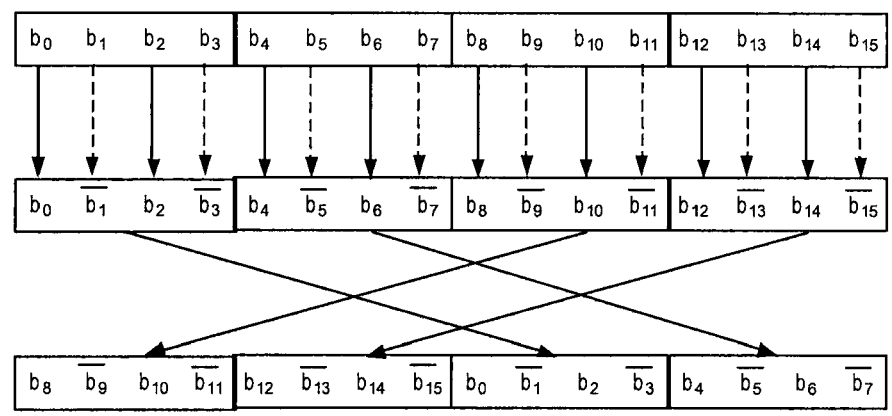
Figure 11(b)
Figure 11(c)

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | ... |
|---|---|---|---|---|---|---|---|---|---|---|---|---|---|---|---|---|---|---|---|---|---|---|---|---|---|
| Original Transmission | | | | | 1 | | | | 5 | 2 | 7 | | 9 | 6 | 3 | | 13 | 10 | 7 | 4 | 17 | 14 | 11 | 8 | ... |
| First Retransmission | | | | | | | 3 | | 1 | | | | 5 | | 11 | 4 | 9 | 2 | 15 | 8 | 13 | 6 | 19 | 12 | ... |
| Second Retransmission | | | | | | | | | | | | | | | | | | | | | | | | | |

Figure 12

| – | – | Q | Q | – | Q | – | – | Q | Q | – | – | Q | Q | – | – | Q | Q | – | – |
|---|---|---|---|---|---|---|---|---|---|---|---|---|---|---|---|---|---|---|---|
| $b_0$ | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $b_{15}$ | $b_{16}$ | $b_{17}$ | $b_{18}$ | $b_{19}$ |

Figure 16

| H | L | H | L | H | L | H | | L | H | L | H | L | H | L | H | L |
|---|---|---|---|---|---|---|---|---|---|---|---|---|---|---|---|---|
| $b_0$ | $b_1$ | $b_2$ | $b_3$ | $b_4$ | $b_5$ | $b_6$ | | $b_7$ | $b_8$ | $b_9$ | $b_{10}$ | $b_{11}$ | $b_{12}$ | $b_{13}$ | $b_{14}$ | $b_{15}$ |

Figure 18(a)

| H | L | H | L | H | L | H | | L | H | L | H | L | H | L | H | L |
|---|---|---|---|---|---|---|---|---|---|---|---|---|---|---|---|---|
| $b_7$ | $\overline{b_8}$ | $b_9$ | $\overline{b_{10}}$ | $b_{11}$ | $\overline{b_{12}}$ | $b_{13}$ | | $\overline{b_{14}}$ | $b_{15}$ | $\overline{b_0}$ | $b_1$ | $\overline{b_2}$ | $b_3$ | $\overline{b_4}$ | $b_5$ | $\overline{b_6}$ |

Figure 18(b)

| H | L | H | L | H | L | H | | L | H | L | H | L | H | L | H | L |
|---|---|---|---|---|---|---|---|---|---|---|---|---|---|---|---|---|
| $b_4$ | $\overline{b_5}$ | $b_6$ | $\overline{b_7}$ | $b_8$ | $\overline{b_9}$ | $b_{10}$ | | $\overline{b_{11}}$ | $b_{12}$ | $\overline{b_{13}}$ | $b_{14}$ | $\overline{b_{15}}$ | $b_0$ | $\overline{b_1}$ | $b_2$ | $\overline{b_3}$ |

Figure 18(c)

| H | L | H | L | H | L | H | | L | H | L | H | L | H | L | H | L |
|---|---|---|---|---|---|---|---|---|---|---|---|---|---|---|---|---|
| $b_{11}$ | $b_{12}$ | $b_{13}$ | $b_{14}$ | $b_{15}$ | $b_0$ | $b_1$ | | $b_2$ | $b_3$ | $b_4$ | $b_5$ | $b_6$ | $b_7$ | $b_8$ | $b_9$ | $b_{10}$ |

Figure 18(d)

| | | | | | | | | | | | | | | | | |
|---|---|---|---|---|---|---|---|---|---|---|---|---|---|---|---|---|
| First Transmission | $b_0$ | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $b_{15}$ |
| Second Transmission | $b_8$ | $b_9$ | $b_{10}$ | $b_{11}$ | $b_{12}$ | $b_{13}$ | $b_{14}$ | $b_{15}$ | $b_0$ | $b_1$ | $b_2$ | $b_3$ | $b_4$ | $b_5$ | $b_6$ | $b_7$ |
| Third Transmission | $b_4$ | $b_5$ | $b_6$ | $b_7$ | $b_8$ | $b_9$ | $b_{10}$ | $b_{11}$ | $b_{12}$ | $b_{13}$ | $b_{14}$ | $b_{15}$ | $b_0$ | $b_1$ | $b_2$ | $b_3$ |
| Fourth Transmission | $b_{12}$ | $b_{13}$ | $b_{14}$ | $b_{15}$ | $b_0$ | $b_1$ | $b_2$ | $b_3$ | $b_4$ | $b_5$ | $b_6$ | $b_7$ | $b_8$ | $b_9$ | $b_{10}$ | $b_{11}$ |

Figure 19

| | H | M | L | H | M | L | H | M | L | H | M | L | H | M | L | H | M | L | H | M | L | H | M | L |
|---|---|---|---|---|---|---|---|---|---|---|---|---|---|---|---|---|---|---|---|---|---|---|---|---|
| First Transmission | $b_0$ | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $b_{15}$ | $b_{16}$ | $b_{17}$ | $b_{18}$ | $b_{19}$ | $b_{20}$ | $b_{21}$ | $b_{22}$ | $b_{23}$ |
| Second Transmission | $b_{10}$ | $b_{11}$ | $b_{12}$ | $b_{13}$ | $b_{14}$ | $b_{15}$ | $b_{16}$ | $b_{17}$ | $b_{18}$ | $b_{19}$ | $b_{20}$ | $b_{21}$ | $b_{22}$ | $b_{23}$ | $b_0$ | $b_1$ | $b_2$ | $b_3$ | $b_4$ | $b_5$ | $b_6$ | $b_7$ | $b_8$ | $b_9$ |
| Third Transmission | $b_5$ | $b_6$ | $b_7$ | $b_8$ | $b_9$ | $b_{10}$ | $b_{11}$ | $b_{12}$ | $b_{13}$ | $b_{14}$ | $b_{15}$ | $b_{16}$ | $b_{17}$ | $b_{18}$ | $b_{19}$ | $b_{20}$ | $b_{21}$ | $b_{22}$ | $b_{23}$ | $b_0$ | $b_1$ | $b_2$ | $b_3$ | $b_4$ |
| Fourth Transmission | $b_{18}$ | $b_{19}$ | $b_{20}$ | $b_{21}$ | $b_{22}$ | $b_{23}$ | $b_0$ | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $b_{15}$ | $b_{16}$ | $b_{17}$ |
| Fifth Transmission | $b_{22}$ | $b_{23}$ | $b_0$ | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $b_{15}$ | $b_{16}$ | $b_{17}$ | $b_{18}$ | $b_{19}$ | $b_{20}$ | $b_{21}$ |
| Sixth Transmission | $b_{11}$ | $b_{12}$ | $b_{13}$ | $b_{14}$ | $b_{15}$ | $b_{16}$ | $b_{17}$ | $b_{18}$ | $b_{19}$ | $b_{20}$ | $b_{21}$ | $b_{22}$ | $b_{23}$ | $b_0$ | $b_1$ | $b_2$ | $b_3$ | $b_4$ | $b_5$ | $b_6$ | $b_7$ | $b_8$ | $b_9$ | $b_{10}$ |

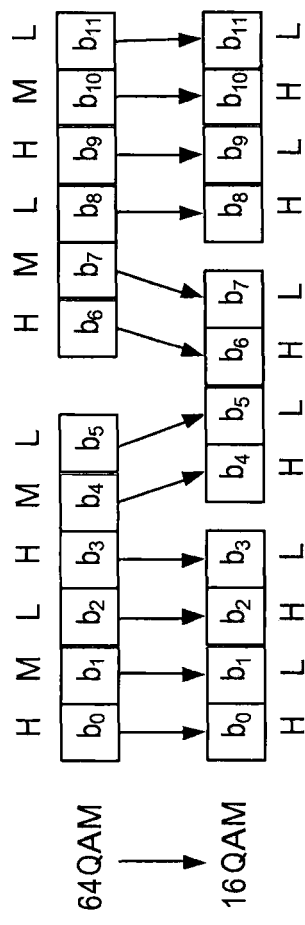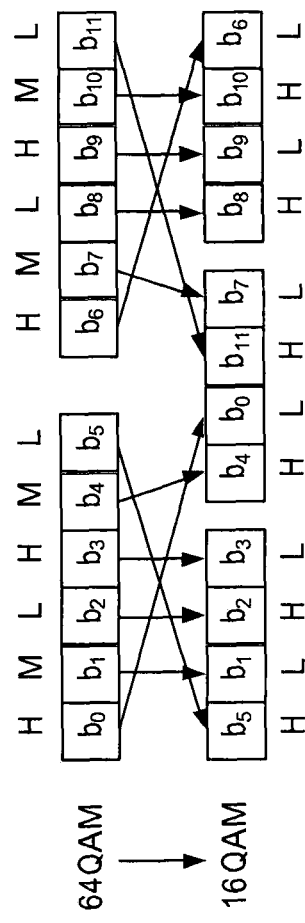
Figure 25(a) PRIOR ART
Figure 25(b)

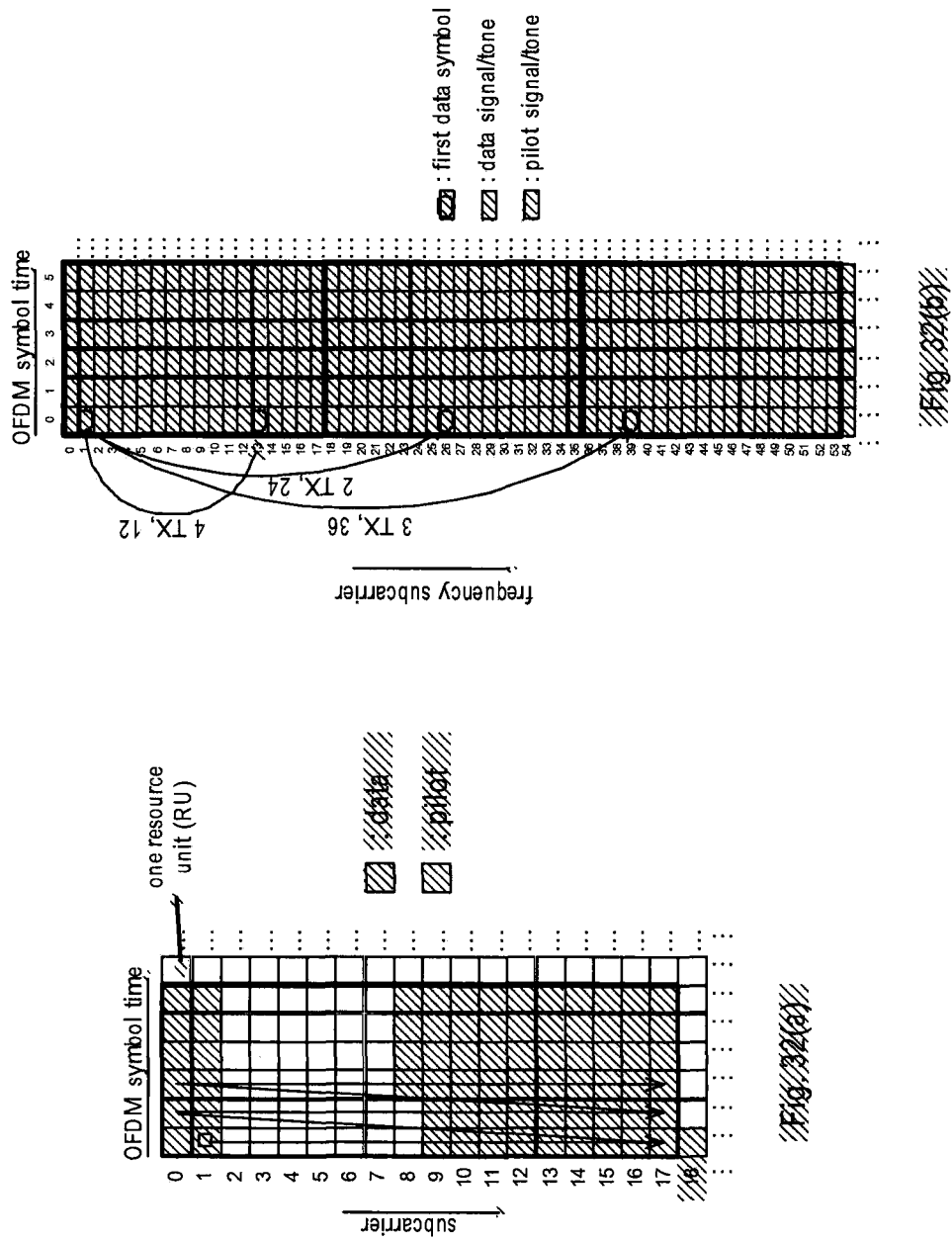

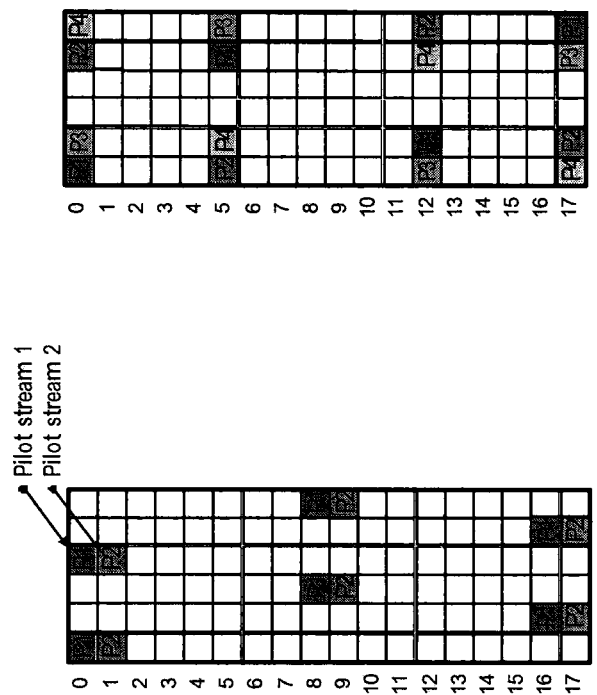

METHODS AND APPARATUS FOR TRANSMITTING/RECEIVING DATA IN A COMMUNICATION SYSTEM

BENEFIT OF PRIORITY

The present application is related to, and claims the benefit of priority of, U.S. Provisional Application No. 61/071,550, filed on May 5, 2008, entitled "Method and Apparatus for Retransmitting/Receiving Data in a Communication System," the entire contents of which are incorporated herein by reference.

TECHNICAL FIELD

This invention relates in general to methods and apparatuses for rearranging data bits for transmission in a hybrid automatic repeat request scheme.

BACKGROUND

Digital communication systems handle transmission errors by providing redundancy information that allows for error detection and/or error correction. To facilitate error detection, redundancy check information, such as cyclic redundancy check (CRC) bits, is transmitted along with user data. A receiver uses the redundancy check information to determine if an error occurred in the transmission. Error correction generally requires more redundancy. Complex forward error correction coding, such as convolutional turbo coding or CTC, may provide enough redundancy for the receiver to correct most transmission errors. Alternatively, the receiver can simply request retransmission of a data packet if the data packet was received with error. This scheme is referred to as automatic repeat request (ARQ). More often, however, a combination of partial forward error correction coding and repeated transmission proves to be more efficient, and is referred to as a hybrid ARQ (HARQ) scheme. In particular, a first transmission includes the user data along with only a portion of the forward error correction information. When the receiver receives the transmission, the receiver attempts to correct transmission errors. If the attempt fails, the receiver requests a retransmission. The transmitter can either repeat the same transmission or transmit a different portion of the redundancy information along with the same or different portion of the user data in subsequent retransmissions. The former is referred to as chase combining (CC) HARQ, and the latter incremental redundancy (IR) HARQ. Hereinafter, the term "retransmission" refers to a requested retransmission of data in an HARQ scheme, wherein the first transmission of the data was received with uncorrectable error. The bits in a retransmission are not necessarily identical to those in the previous transmission, such as in IR HARQ.

Even though the repeated transmissions in IR HARQ differ from one to the next, some of the data are repeated. If the channel quality does not change, the same data likely will suffer the same channel distortion. Methods have been proposed to achieve diversity in channel quality to improve the performance of HARQ. One particular method, referred to as constellation rearrangement, alternates modulation schemes on retransmissions. For example, in a proposal to the 3GPP TSG-RAN Working Group 1 Meeting #19, document number TSGR1#19(01)0237, Panasonic proposed a method of enhancing HARQ by rearranging the constellation. This proposal is briefly described below.

A constellation diagram represents a digital quadrature amplitude modulation (QAM) or phase-shift keying (PSK) scheme. In QAM, the data bits modulate two orthogonal carrier waves, i.e., a cosine wave, or an in-phase carrier, and a sine wave, or a quadrature carrier, which are combined and transmitted. The data bits determine the amplitudes and phases of the carrier waves, although in QAM the phases of the carrier waves are either 0° or 180°. In PSK, the data bits modulate the phase of a single carrier wave. FIG. 1 illustrates an exemplary constellation diagram for an order-4 QAM (16-QAM) scheme, in which a modulation symbol has 16 possible values and thus represents 4 bits of data In FIG. 1, the I-axis represents the amplitude of the in-phase carrier, and the Q-axis represents the amplitude of the quadrature carrier. The data bits are grouped into symbols each including 4 bits, $i_1 q_1 i_2 q_2$. $i_1$ and $i_2$ modulate the in-phase carrier, where $i_1$ modulates the phase of the in-phase carrier and $i_2$ modulates the amplitude of the in-phase carrier. In particular, the phase is 0° if $i_1=0$ and 180° if $i_1=1$, and the amplitude is greater when $i_2=1$ than that when $i_2=0$. Similarly, $q_1$ and $q_2$ modulate the quadrature carrier, where $q_1$ modulates the phase of the quadrature carrier and $q_2$ modulates the amplitude of the quadrature carrier.

Because the data bits modulate the carrier waves in different aspects, the data bits have different significances and different reliabilities. Particularly, absolute values are more difficult to detect with accuracy than the sign of the amplitude (or the phase) of the carrier wave. In other words, in the example given in FIG. 1, bits $i_2$ and $q_2$ are more susceptible to transmission errors than $i_1$ and $q_1$.

Panasonic proposed modifying the constellation diagram from transmission to transmission such that the same bits map onto different points of the constellation diagrams, as a result of which the reliability of all the data bits will be substantially the same. FIG. 2 shows one particular proposal by Panasonic.

As shown in FIG. 2, the constellation diagram of FIG. 1 is modified such that $i_1$ and $q_1$ modulate the amplitudes of the carrier waves, while $i_2$ and $q_2$ modulate the phases. As a result, the reliabilities of $i_2$ and $q_2$ are improved, while those of i and q, are degraded. Thus, if the same data bits are retransmitted alternatively using the constellation diagrams shown in FIGS. 1 and 2, the data bits will have substantially the same reliability over time.

The constellation modification scheme proposed by Panasonic is intended to be implemented in both a transmitter and a receiver. FIG. 3(a) shows portions of a transmitter 300 for processing information bits representing user data and modulating a carrier wave with the processed information bits. In transmitter 300, a CRC adder 302 appends CRC bits to the information bits, a channel encoder 304 encodes the information bits appended with CRC bits to provide forward error correction, a channel interleaver 306 rearranges the encoded bits to protect against burst errors, a circuit block 308 punctures, or removes, certain ones of the encoded and interleaved bits to increase throughput, and a modulator 310 modulates the carrier wave with the encoded, interleaved, and punctured information bits. A controller 312 controls the channel encoding, interleaving, puncturing, and modulation processes. Controller 312 may act upon an acknowledgement signal or a negative acknowledgement signal received from the other side of the channel indicating that the previous transmission was successful or not.

With reference to FIG. 3(a), modification of the constellation diagram can be implemented in controller 312 and modulator 310, where controller 312 controls modulator 310 to modulate the carrier waves using the corresponding constellation diagram for each retransmission.

FIG. 3(b) shows portions of a receiver 400 for processing signals received from transmitter 300. In receiver 400, a demodulator 402 demodulates the received signals to generate the encoded, interleaved, and punctured information bits by removing the carrier wave. A de-interleaver 404 restores the order of the encoded bits by reversing the interleaving operation performed by channel interleaver 306. A combiner 406 combines multiple copies of data bits from the repeated transmissions to best estimate the data bits. A channel decoder 408 decodes the data bits using the forward error correction information added by channel encoder 304 to recover the data bits and the CRC bits. A CRC checker 410 checks the data bits and the CRC bits for any error. If CRC checker 410 detects an error, a negative acknowledgement (NACK) will be sent back to the transmitter to initiate a retransmission. Otherwise, an acknowledgement (ACK) will be sent. A buffer 412 buffers the received bits from previous transmissions so that the buffered bits can be combined with the bits received in subsequent transmissions of the same data bits by combiner 406. A controller 414 controls the operations of demodulator 402, de-interleaver 404, combiner 406, channel decoder 408, CRC checker 410, and buffer 412, and also controls the transmission of an acknowledgement or negative acknowledgement.

Similarly, with reference to FIG. 3(b), when a transmission arrives at receiver 400, demodulator 402 uses the corresponding constellation diagram, under the control of controller 414, to demodulate the received signals.

Modification of the constellation diagram can also be implemented through a bit rearranger, in which the bits within each symbol are rearranged, i.e., interleaved and/or inverted. As a result, although the same bit positions map onto the same positions on a constellation diagram, because the bits have changed positions and/or have been inverted, the bits can map onto different positions of the same constellation diagram from transmission to transmission. The result is the same as transmitting the bits in the symbol without interleaving or inversion, but using a different constellation diagram for each transmission. For example, equivalent to sending a symbol of 4 bits $i_1 q_1 i_2 q_2$ using the constellation diagram shown in FIG. 2, the same 4 bits can be rearranged as $i_2 q_2 \bar{i}_1 \bar{q}_1$, where $\bar{i}_1$ and $\bar{q}_1$ are $i_1$ and $q_1$ logically inverted, respectively. A bit rearranger may be inserted between circuit block 308 and modulator 310 in FIG. 3(a). One example of a bit rearranger for implementing constellation diagram modification is discussed in U.S. patent application by Jae-Seung Yoom et al., published on Apr. 17, 2003, as Publication No. 2003/0072292.

There has also been proposed a method called subcarrier rearrangement for orthogonal frequency division multiplex (OFDM) systems to improve the performance of HARQ. In an OFDM system, a data bit stream is carried by a number of orthogonal frequency subcarriers. Because the subcarriers have different frequencies and experience different channel distortions, data bits transmitted over one subcarrier have different reliabilities than those over another subcarrier. The subcarrier rearrangement method addresses this lack of uniformity by swapping the subcarriers on retransmissions.

FIG. 4 shows a method of subcarrier rearrangement proposed by Kian Chung Beh, et al. in "Performance Evaluation of Hybrid ARQ Scheme of 3GPP LTE OFDMA System," Proc. PIMRC 2007. In particular, user data are demultiplexed into N bit streams respectively carried by N subcarriers. In the first retransmission, the bit streams are shifted by N/2 subcarriers. In other words, the third quarter of the subcarriers now carry the bit streams originally transmitted over the first quarter of the subcarriers, and the fourth quarter of the subcarriers now carry the bit streams originally transmitted over the second quarter of the subcarriers, etc. For the second retransmission, the bit streams are further shifted by N/4 subcarriers. For the third retransmission, the bit streams are even further shifted by N/2 subcarriers. Then, the fourth retransmission, if required, will have the same arrangements as the original transmission.

The constellation modification, the bit rearranger implementing the constellation modification method, and the subcarrier rearrangement method all involve rearranging the bits or constellation diagram on a symbol basis. In other words, they all attempt to balance the reliabilities of the bits within the same symbols. However, bit reliabilities tend to fluctuate from symbol to symbol, and this fluctuation cannot be addressed by the methods proposed by Panasonic, Yoom et al., or Beh et al.

SUMMARY

According to a first aspect of the present disclosure, there is provided a method of error control, including forming a plurality of first data symbols from a plurality of data bits, transmitting a first signal including the plurality of first data symbols, receiving a request for retransmission, forming a plurality of second data symbols from the plurality of data bits, and transmitting a second signal including the plurality of second data symbols. At least one of the first data symbols is formed from several of the plurality of data bits such that none of the second data symbols is formed from the several of the plurality of data bits.

According to a second aspect of the present disclosure, there is provided an apparatus, including an encoder to encode information bits to form a set of encoded bits, a bit rearranger to arrange the set of encoded bits to form a first bit stream to be transmitted, and a controller to determine if a transmission of the first bit stream was successfully received. The bit rearranger rearranges the set of encoded bits to form a second bit stream to be transmitted if the transmission of the first bit stream was not successfully received. The first bit stream has a plurality of first data symbols, and the second bit stream has a plurality of second data symbols. At least one of the first data symbols is formed from several of the set of encoded bits such that none of the second data symbols is formed from the several of the set of encoded bits.

According to a third aspect of the present disclosure, there is provided an apparatus, including a receiver to receive a first signal and a second signal from a transmitter, wherein the first signal includes carrier waves modulated with a first bit stream including a plurality of first data symbols, and the second signal includes carrier waves modulated with a second bit stream including a plurality of second data symbols, wherein the first and second data symbols are formed from the same data bits, and wherein at least one of the first data symbols is formed from several of the same data bits such that none of the second data symbols is formed from the several of the same data bits. The apparatus also includes a bit rearranger to rearrange the bits in the first and second bit streams, a storage device to store the rearranged bits in the first and second bit streams, and a combiner to combine the rearranged bits in the first and second bit streams.

According to a fourth aspect of the present disclosure, there is provided a method of adaptive modulation, including forming a plurality of first data symbols from a plurality of data bits, modulating carrier waves with the plurality of first data symbols according to a first modulation scheme, transmitting first signals including the carrier waves modulated with the plurality of first data symbols, receiving a request for retransmission, forming a plurality of second data symbols from the plurality of data bits, modulating the carrier waves with the plurality of second data symbols according to a second modulation scheme different from the first modulation scheme, and transmitting second signals including the carrier waves modulated with the plurality of second data symbols. Forming the plurality of second data symbols includes modifying the sequence of the plurality of data bits.

According to a fifth aspect of the present disclosure, there is provided an apparatus, including an encoder to encode information bits to form a set of encoded bits, a bit rearranger to arrange the set of encoded bits to form a first bit stream to be transmitted, a modulator to modulate a carrier wave, and a controller to determine if a transmission of the first bit stream is successfully received. The bit rearranger modifies the sequence of the set of encoded bits to form a second bit stream to be transmitted if the transmission of the first bit stream is not successfully received. The first bit stream has a plurality of first data symbols. The second bit stream has a plurality of second data symbols. The modulator modulates the carrier wave with the plurality of first data symbols according to a first modulation scheme and modulates the carrier wave with the plurality of second data symbols according a second modulation scheme different from the first modulation scheme.

Additional features and advantages of the invention will be set forth in part in the description which follows, and in part will be apparent from that description, or may be learned by practice of the invention. The features and advantages of the invention will be realized and attained by means of the elements and combinations particularly pointed out in the appended claims.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate exemplary embodiments and, together with the description, serve to explain features, advantages, and principles of the invention.

In the drawings,

FIG. 7(a) shows the constellation diagram currently defined in the IEEE 802.16 standard for 64-QAM modulation;

FIGS. 7(b)-7(f) show five modified constellation diagrams for five retransmissions according to exemplary embodiments;

FIGS. 11(a)-11(d) show exemplary bit rearrangements according to exemplary embodiments;

FIG. 12 shows an exemplary inter-symbol bit rearrangement with bit regrouping according to exemplary embodiments;

FIG. 16 illustrates grouping symbol bits into bit couples according to exemplary embodiments;

FIGS. 18(a)-18(d) illustrate an inter-symbol bit rearrangement scheme according to exemplary embodiments;

FIG. 19 illustrates an inter-symbol bit rearrangement scheme according to exemplary embodiments;

FIG. 20 illustrates an inter-symbol bit rearrangement scheme according to exemplary embodiments;

Figure 21:
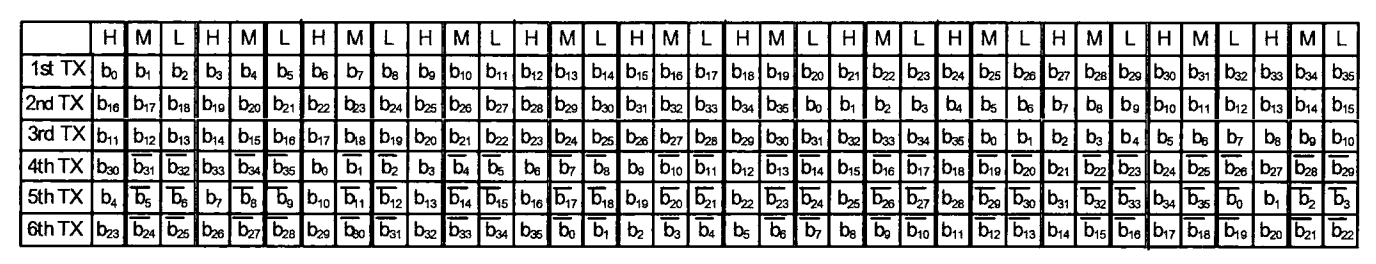

FIG. 21 illustrates an inter-symbol bit rearrangement scheme according to exemplary embodiments;

FIG. 25(a) shows an example of a conventional modulation scheme switch during retransmissions;

FIG. 25(b) shows an exemplary modulation switch during retransmissions according to exemplary embodiments;

FIGS. 32(a), 32(c), and 32(d) show the allocation of resource units (RU) in an OFDM system defined by the IEEE 802.16m standards; and FIG. 32(b) illustrates bit rearrangements according to exemplary embodiments applied in an OFDM system.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Consistent with exemplary embodiments, there are provided method and apparatus for constellation modification for OFDM systems.

OFDM or OFDMA (orthogonal frequency division multiple access) systems, as defined by the industry's IEEE 802.16 standard and commonly referred to as the WiMAX standards, use such modulation schemes as QPSK (quadrature phase shift keying), 16-QAM, and/or 64-QAM. Exemplary embodiments provide constellation rearrangement for the 16-QAM and 64-QAM modulation schemes to improve performance of HARQ.

Figure 5A:
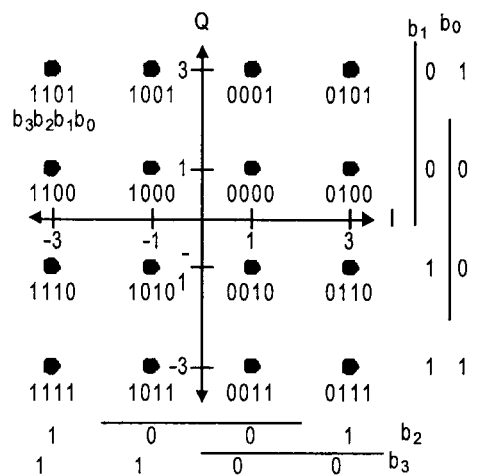
FIG. 5(a) shows the constellation diagram currently defined in the IEEE 802.16 standard for 16-QAM modulation.

FIG. 5(a) shows a constellation diagram currently defined in the IEEE 802.16 standard for 16-QAM modulation. The four bits in each modulation symbol are denoted $b_3$, $b_2$, $b_1$, $b_0$, where $b_3$ and $b_2$ modulate the in-phase carrier and $b_1$ and $b_0$ modulate the quadrature carrier. Bits $b_3$ and $b_1$ respectively modulate the phases of the in-phase and quadrature carriers. In particular, the phase is 0° when $b_3$ or $b_1$ is 0 and 180° when $b_3$ or $b_1$ is 1. Bits $b_2$ and $b_0$ respectively modulate the amplitudes of the in-phase and quadrature carriers, where the amplitude is greater when $b_2$ or $b_0$ is 1 than otherwise. Thus, $b_3$ and $b_1$ have higher reliabilities than $b_2$ and $b_0$.

Figure 5B:
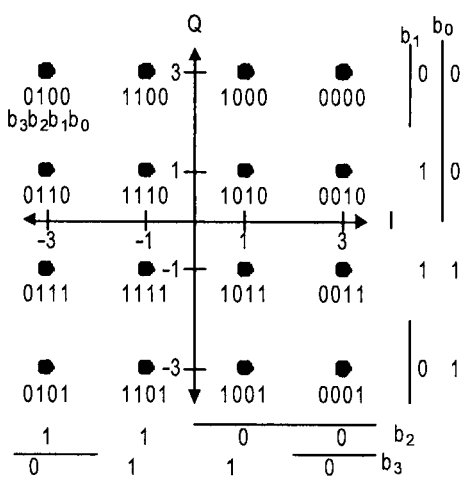
FIGS. 5(b)-5(d) show three modified constellation diagrams for retransmissions according to an exemplary embodiment.
Figure 5C:
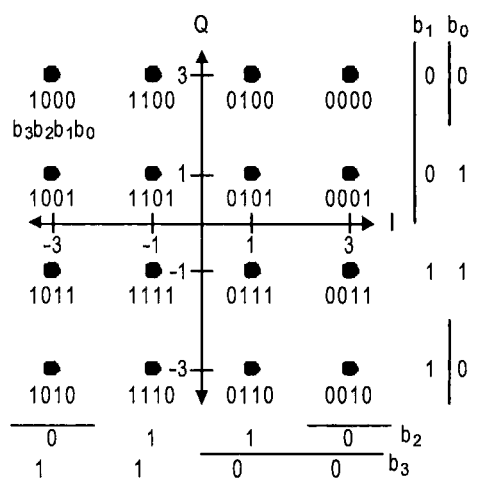
Figure 5D:
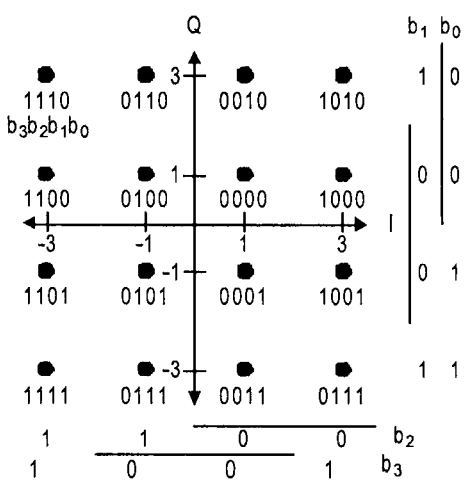

Instead of using the constellation diagram of FIG. 5(a) for all the transmissions in the HARQ scheme, as currently specified in the IEEE 802.16 standard, exemplary embodiments provide modified constellation diagrams to be used together with the constellation diagram shown in FIG. 5(a). In other words, the first transmission in the HARQ scheme may use the constellation diagram of FIG. 5(a), and the retransmissions use modified constellation diagrams. As an example, FIGS. 5(b)-5(d) show three modified constellation diagrams to be used respectively for the first, second, and third retransmissions. In particular, as shown in FIG. 5(b), for the first retransmission, $b_3$ modulates the amplitude (greater when $b_3$=0) of the in-phase carrier, $b_2$ modulates the phase (0° when $b_2$=0) of the in-phase carrier, $b_1$ modulates the amplitude (greater when $b_1$=0) of the quadrature carrier, and $b_0$ modulates the phase (0° when $b_0$=0) of the quadrature carrier. As shown in FIG. 5(c), for the second retransmission, $b_3$ modulates the phase (0° when $b_3$=0) of the in-phase carrier, $b_2$ modulates the amplitude (greater when $b_2$=0) of the in-phase carrier, $b_1$ modulates the phase (0° when $b_1$=0) of the quadrature carrier, and $b_0$ modulates the amplitude (greater when $b_0$=0) of the quadrature carrier. As shown in FIG. 5(d), for the third retransmission, $b_3$ modulates the amplitude (greater when $b_3$=1) of the in-phase carrier, $b_2$ modulates the phase (0° when $b_2$=0) of the in-phase carrier, $b_1$ modulates the amplitude (greater when $b_1$=1) of the quadrature carrier, and $b_0$ modulates the phase (0° when $b_0$=0) of the quadrature carrier.

When retransmissions are needed, the four constellation diagrams shown in FIGS. 5(a)-5(d) may be used in rotation, but not necessarily in the order of FIG. 5(a) through FIG. 5(d).

By using the four constellation diagrams in alternation for different retransmissions, the reliability of a particular bit in a data symbol is averaged out and substantially the same as that of the other bits in that data symbol.

Bit rearrangement can achieve the same effect as constellation rearrangement. For example, the bit rearrangement shown in Table 1 below has the same effect as the constellation rearrangement shown in FIGS. 5(a)-5(d).

TABLE 1

| Transmission No. | Bit Rearrangement | Corresponding Constellation |
| --- | --- | --- |
| 1 | $b_3 b_2 b_1 b_0$ | FIG. 5(a) |
| 2 | $b_2 \bar{b}_3 b_0 \bar{b}_1$ | FIG. 5(b) |
| 3 | $b_3 \bar{b}_2 b_1 \bar{b}_0$ | FIG. 5(c) |
| 4 | $b_2 b_3 b_0 b_1$ | FIG. 5(d) |

As Table 1 shows, in addition to certain bits being swapped, the bits modulating the amplitude of the carrier waves can be logically inverted to achieve greater diversity.

Additional retransmissions may use the constellation diagrams or bit rearrangements in rotation, until an acknowledgement is received or the number of retransmissions reaches a limit.

Figure 6:
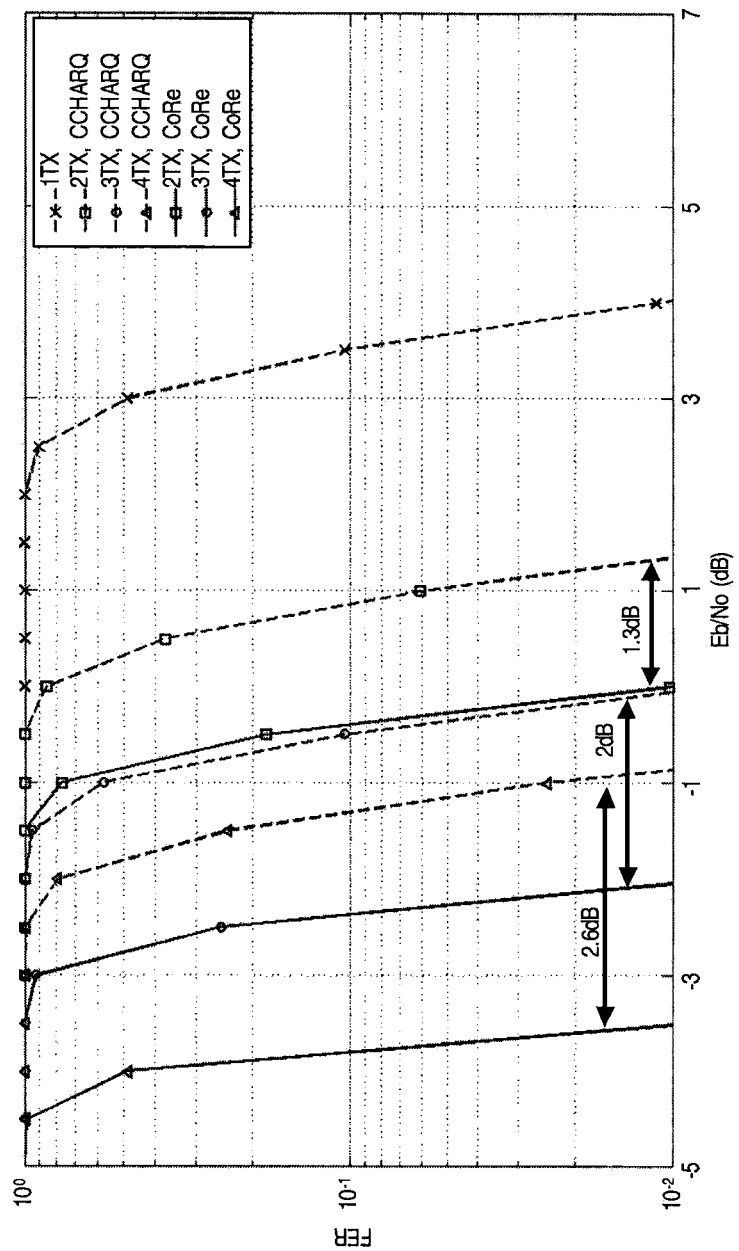
FIG. 6 shows simulation results comparing constellation/bit rearrangement scheme shown in FIGS. 5(a)-5(d) against a chase combining HARQ scheme without constellation/bit rearrangements.

FIG. 6 shows simulation results comparing the constellation/bit rearrangement scheme shown in FIGS. 5(a)-5(d) and Table 1 against a chase combining HARQ scheme without constellation/bit rearrangements. In FIG. 6, 1TX, 2TX, 3TX, 4TX refer to the initial transmission and three retransmissions, CCHARQ refers to chase combining HARQ without constellation/bit rearrangement, and CoRe refers to the constellation/bit rearrangement discussed above with reference to FIGS. 5(a)-5(d) and Table 1. The data bits are encoded with a convolutional turbo code (CTC) with a coding rate R=1/2 specified in the IEEE 801.16 standards, and the modulation scheme is 16-QAM. The turbo coding was run for 8 iterations. FIG. 6 plots frame error rate (FER) as the vertical axis and bit energy to noise ratio (Eb/No) as the horizontal axis. As FIG. 6 shows, the constellation/bit rearrangement scheme proposed in FIGS. 5(a)-5(d) and Table 1 reduces the required bit energy to noise ratio of the HARQ by about 1.3 dB on the first retransmission (or second transmission), by about 2 dB on the second retransmission, and by about 2.6 dB on the third retransmission.

Figures 7A, 7B:
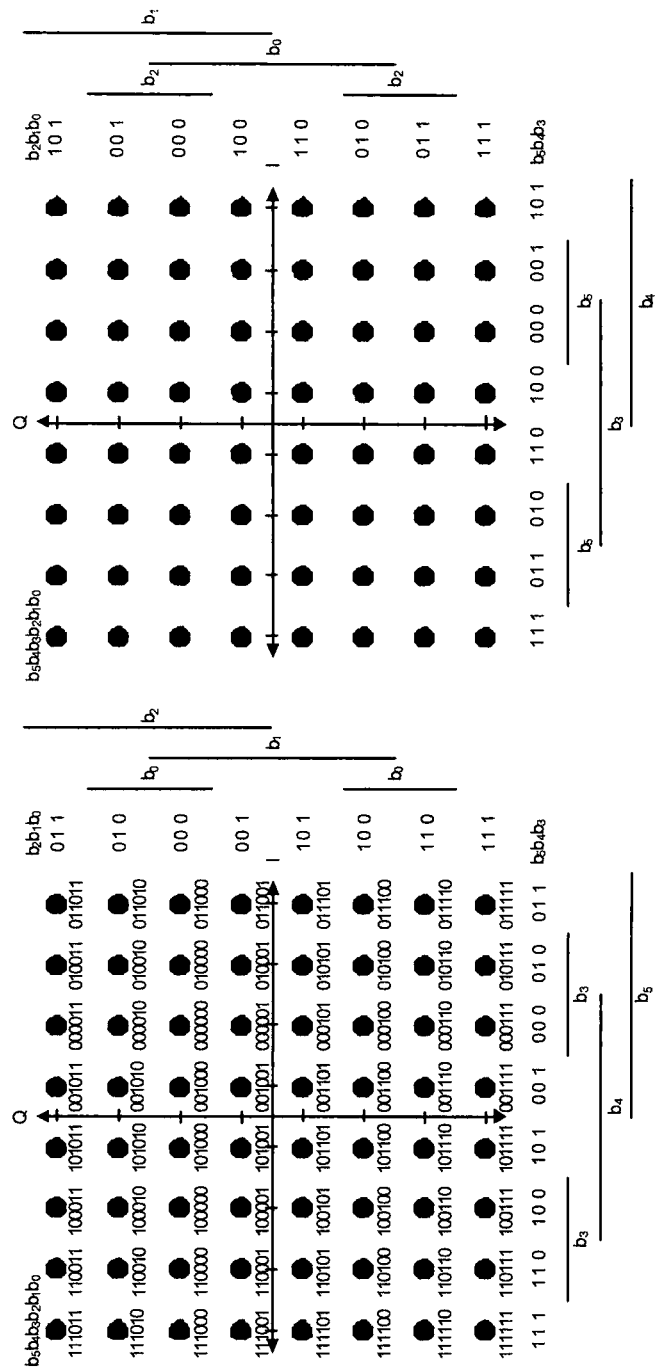

Exemplary embodiments also provide a constellation rearrangement scheme for 64-QAM modulation used in the IEEE 802.16 standard. FIG. 7(a) shows the constellation diagram currently defined in the IEEE 802.16 standard for 64-QAM. Each data symbol consists of 6 data bits, $b_5$, $b_4$, $b_3$, $b_2$, $b_1$, $b_0$, where $b_5$, $b_4$, $b_3$ modulate the in-phase carrier, and $b_2$, $b_1$, $b_0$ modulate the quadrature carrier. With three bits modulating each carrier, the amplitude thereof is defined with a finer resolution. Particularly, $b_5$ and $b_2$ still respectively modulate the phases of the carriers, but $b_4$ and $b_3$ together modulate the amplitude of the in-phase carrier at four discrete levels, and $b_1$ and $b_0$ together modulate the amplitude of the quadrature carrier at four discrete levels. As FIG. 7(a) shows, the amplitude of the in-phase carrier is the greatest when $b_4 b_3$=11, is the least when $b_4 b_3$=01, and has intermediate values when $b_4 b_3$=10 or 00. The modulation of the quadrature carrier is similar and not explained in detail herein.

Instead of using the constellation diagram of FIG. 7(a) for all the transmissions in the HARQ scheme, as currently specified in the IEEE 802.16 standard, exemplary embodiments provide modified constellation diagrams to be used together with the constellation diagram shown in FIG. 7(a). In other words, the first transmission in the HARQ scheme uses the constellation diagram of FIG. 7(a), and the retransmissions use modified constellation diagrams. As an example, FIGS. 7(b)-7(f) show five modified constellation diagrams for 5 retransmissions. In particular, in FIG. 7(b), $b_4$ modulates the phase of the in-phase carrier, while $b_5$ and $b_3$ together modulate the amplitude of the in-phase carrier at four different levels. Further, $b_1$ modulates the phase of the quadrature carrier, while $b_2$ and $b_0$ together modulate the amplitude of the quadrature carrier at four different levels. The constellation diagrams in FIGS. 7(c)-7(f) should now be understandable by one skilled in the art and are not explained in detail herein.

Similarly, the constellation modification scheme shown in FIGS. 7(a)-7(f) can be achieved through bit rearrangement, as illustrated in Table 2 below.

TABLE 2

Figures 7E, 7F:
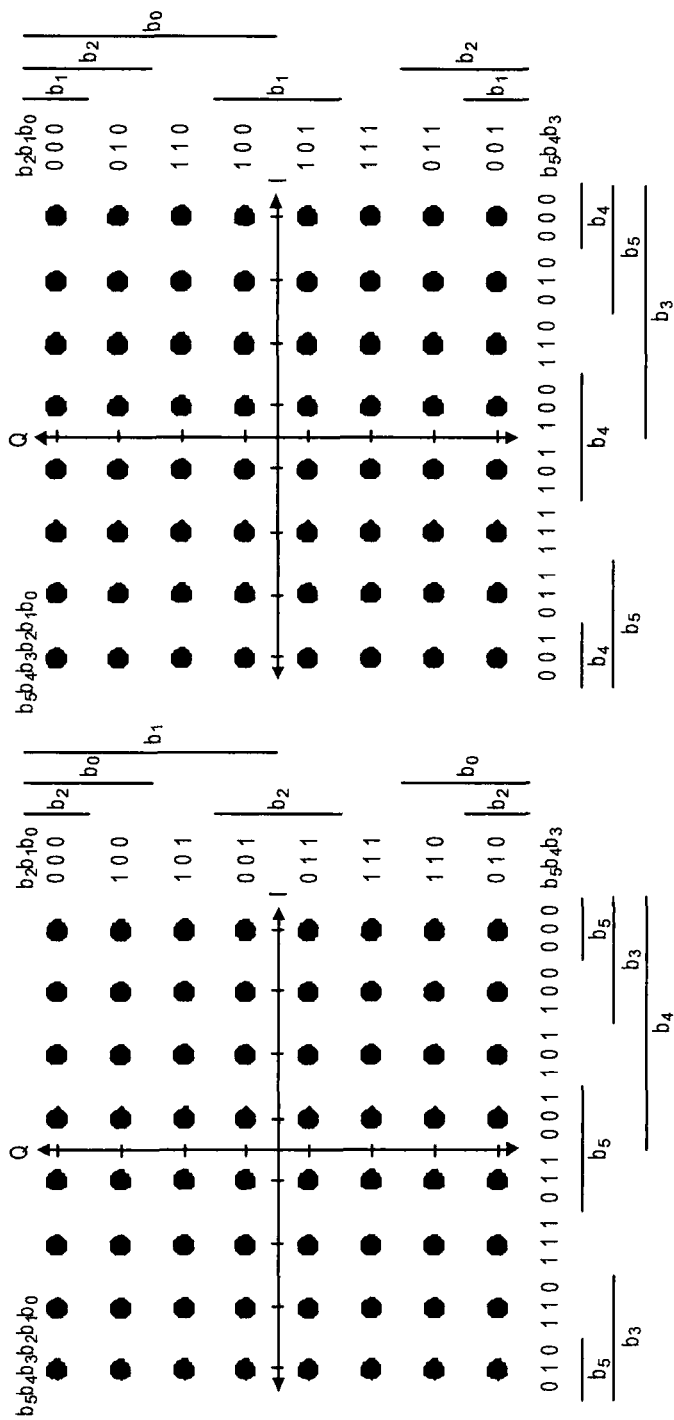

| Transmission No. | Bit Rearrangement | Corresponding Constellation |
|---|---|---|
| 1 | $b_5 b_4 b_3 b_2 b_1 b_0$ | FIG. 7(a) |
| 2 | $b_4 b_3 b_5 b_1 b_0 b_2$ | FIG. 7(b) |
| 3 | $b_3 b_5 b_4 b_0 b_2 b_1$ | FIG. 7(c) |
| 4 | $b_5 \bar{b}_4 \bar{b}_3 b_2 \bar{b}_1 b_0$ | FIG. 7(d) |
| 5 | $b_4 \bar{b}_3 \bar{b}_5 b_1 \bar{b}_0 b_2$ | FIG. 7(e) |
| 6 | $b_3 \bar{b}_5 \bar{b}_4 b_0 \bar{b}_2 b_1$ | FIG. 7(f) |

As Table 2 shows, in addition to certain bits being swapped, at least one bit modulating the amplitude of a carrier wave can be logically inverted to achieve greater diversity.

Additional retransmissions may use the constellation diagrams or bit rearrangements in rotation, until an acknowledgement is received or the number of retransmissions reaches a limit.

Figure 8:
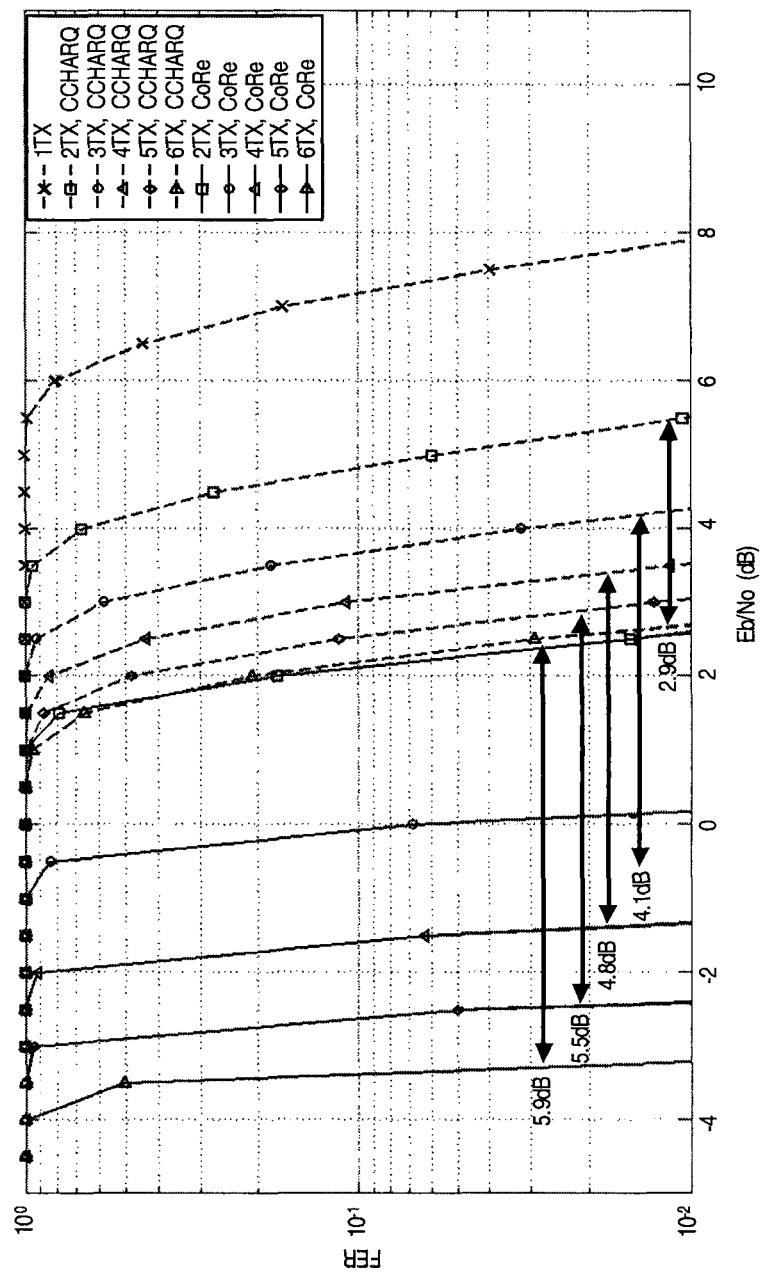
FIG. 8 shows simulation results comparing the constellation/bit rearrangement scheme shown in FIGS. 7(a)-7(f) against a chase combining HARQ scheme without constellation/bit rearrangements.

FIG. 8 shows simulation results comparing the constellation/bit rearrangement scheme shown in FIGS. 7(a)-7(f) and Table 2 against a chase combining HARQ scheme without constellation/bit rearrangements. In FIG. 8, 1TX, 2TX, 3TX, 4TX, 5TX, 6TX refer to the initial transmission and five retransmissions, CCHARQ refers to chase combining HARQ without constellation/bit rearrangement, and CoRe refers to the constellation/bit rearrangement scheme shown in FIGS. 7(a)-7(f) and Table 2. The data bits are encoded with the CTC encoder with a coding rate R=1/2, and the modulation scheme is 64-QAM. The turbo coding was run for 8 iterations. FIG. 8 plots frame error rate (FER) as the vertical axis and bit energy to noise ratio (Eb/No) as the horizontal axis. As FIG. 8 shows, the constellation/bit rearrangement scheme proposed in FIGS. 7(a)-7(f) and Table 2 reduces the required bit energy to noise ratio of the HARQ by about 2.9 dB on the first retransmission (or second transmission), by about 4.1 dB on the second retransmission, by about 4.8 dB on the third retransmission, by about 5.5 dB on the fourth retransmission, and by about 5.9 dB on the fifth retransmission.

The constellation rearrangement schemes shown in FIGS. 5(a)-5(d) and 7(a)-7(f) and Tables 1 and 2 are only exemplary. Exemplary embodiments are not limited to any specifics shown in these figures. Rather, the constellation diagrams for the retransmissions are designed to achieve the best performances, such as successful decoding with the least number of retransmissions. One way of defining the constellation diagrams consistent with exemplary embodiments is to define, based on the original constellation diagram, a second constellation diagram with the best performance, e.g., the lowest frame error at the lowest bit energy to noise ratio, highest throughput, etc., among all the available constellation diagrams. Once the original and second constellation diagrams are chosen, the third constellation diagram is defined to be the one that provides the best performance among the remaining available constellation diagrams. One skilled in the art should now be able to appreciate this method and therefore no further detailed presented is included herein.

It is to be understood, however, that there are multiple ways to determine whether a constellation diagram provides the best performance. The environment, the specific needs of an application, etc., must be considered. A constellation diagram might perform better in one environment than in another. Some applications may focus on one particular aspect of the performance, and a constellation diagram that generates satisfactory results in other aspects might not be suitable. In addition, if computer simulation is used to find the best constellation diagram, the determination apparently depends on how well the simulation program simulates the real communication environment and the needs of the particular application.

Consistent with exemplary embodiments, there are also provided methods for improving system performance through bit rearrangements. Such methods provide bit rearrangements across symbol boundaries, thereby balancing bit reliabilities over multiple modulation symbols.

Figure 9:
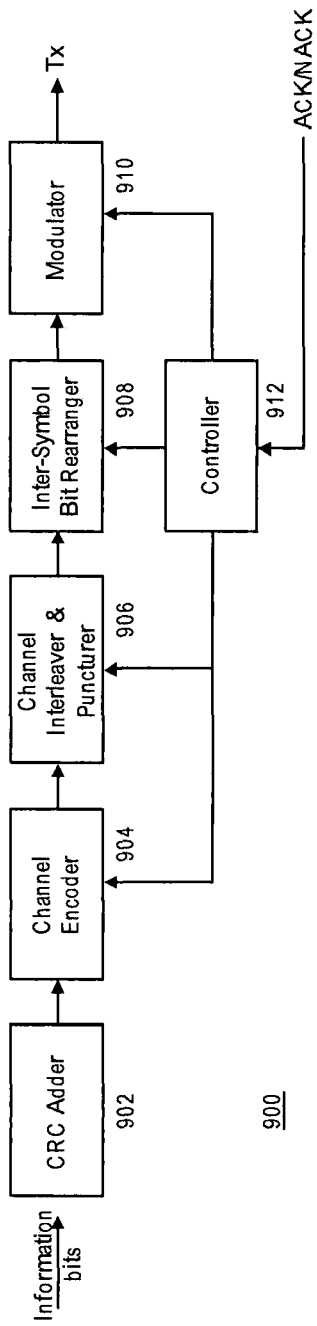
FIG. 9 shows portions of a transmitter for data processing according to exemplary embodiments.

FIG. 9 shows portions of a transmitter 900 for data processing consistent with exemplary embodiments. Particularly, a CRC adder 902 appends CRC bits to information bits to provide for error detection at the receiver end, a channel encoder 904 encodes the information bits appended with CRC bits, a circuit block 906 provides channel interleaving and puncturing, a bit rearranger 908 rearranges bits across multiple symbols, and a modulator 910 modulates the carrier wave with the encoded, interleaved, punctured, and rearranged information bits. A controller 912 controls the bit rearranging process. Controller 912 may act upon an acknowledgement signal or negative acknowledgement signal received from the other end of the channel indicating that a previous transmission was successful or not. Controller 912 may also control the channel encoding, interleaving, puncturing, and modulation processes. Alternatively, additional controllers may be included in transmitter 900 to provide such controls.

Figure 10A:
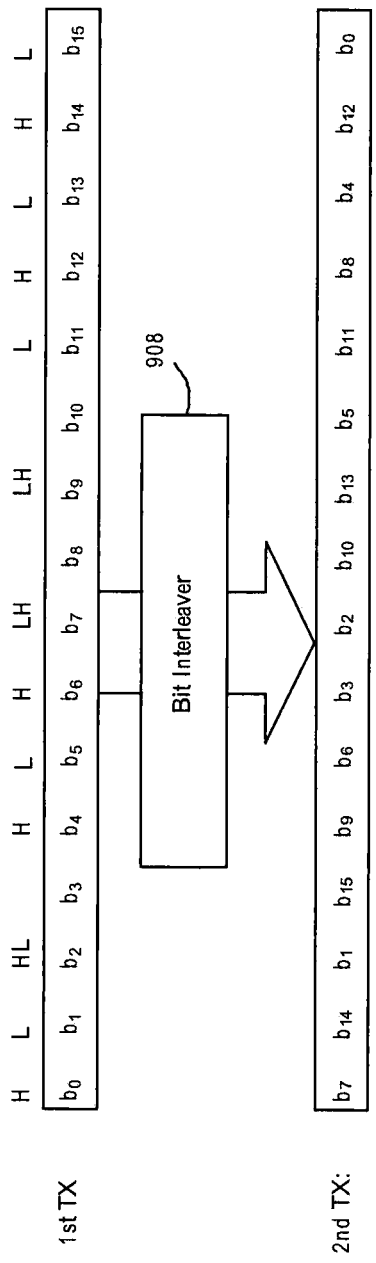
FIG. 10(a) shows an exemplary bit interleaving according to exemplary embodiments.
Figure 10B:
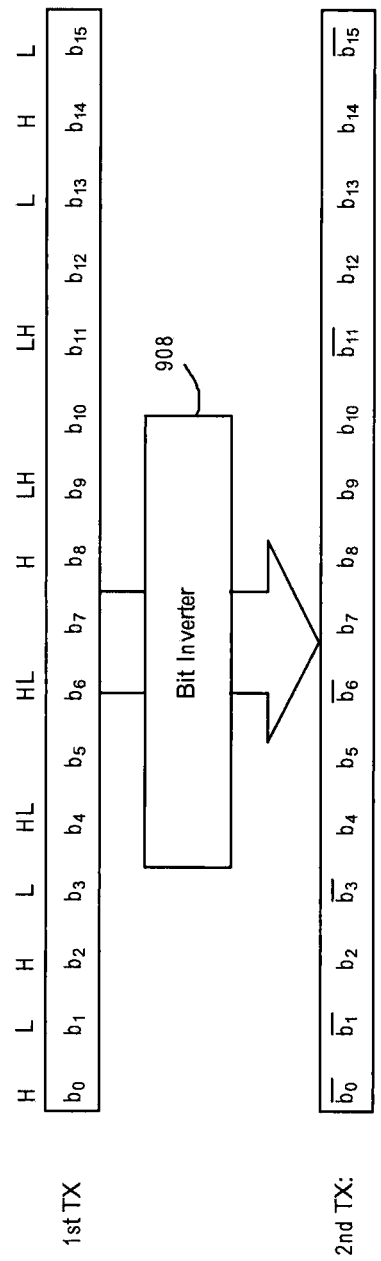
FIG. 10(b) shows an exemplary bit inversion according to exemplary embodiments.
Figure 10C:
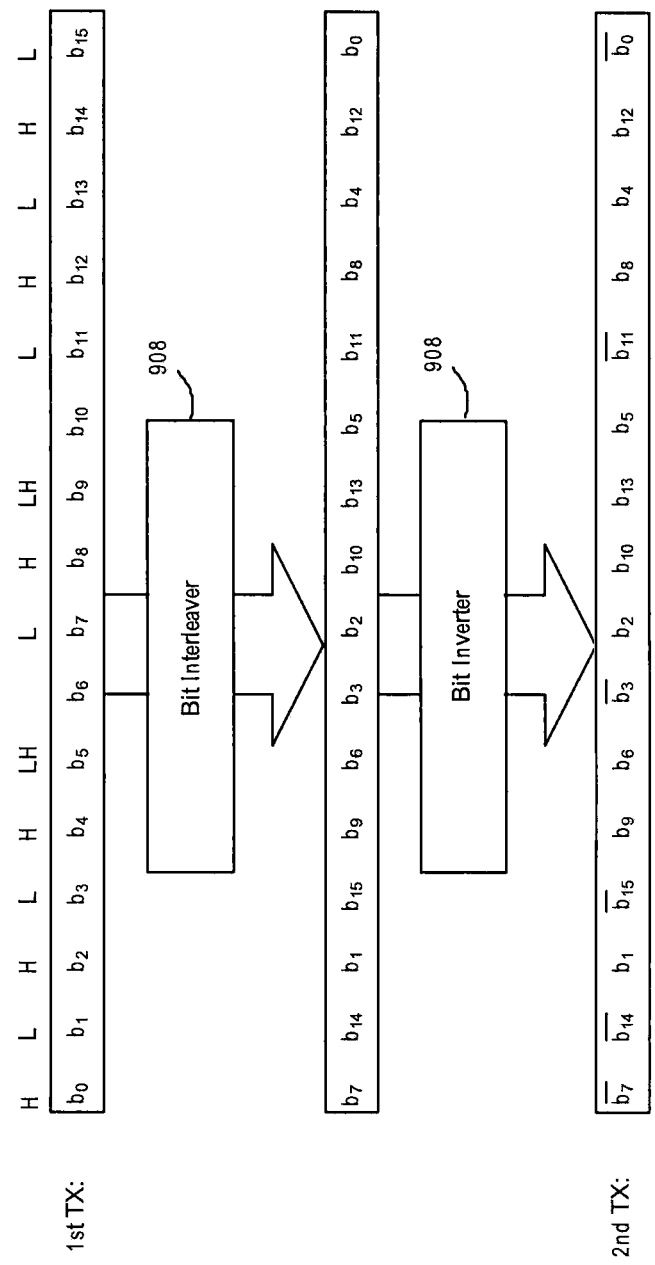
FIG. 10(c) shows an exemplary inter-symbol bit rearrangement according to exemplary embodiments.

Consistent with exemplary embodiments, bit rearranger 908 rearranges bits across several symbols so that the rearranged bits have similar bit reliabilities. Bit rearrangement may include bit interleaving and, optionally, bit inversion. Bit interleaving involves rearranging the bits of several symbols in a pseudorandom order, as shown in, e.g., FIG. 10(a). Bit inversion involves inverting several bits in a pseudorandom manner, as shown in, e.g., FIG. 10(b). FIG. 10(c) shows an inter-symbol bit rearrangement with bit interleaving and bit inversion combined. It is assumed in FIGS. 10(a)-10(c) that a packet includes 16 coded bits grouped into 4-bit symbols. Legend "L" indicates the corresponding bit has a low bit reliability and "H" indicates the corresponding bit has a high reliability. FIGS. 10(a)-10(c) only show one bit rearrangement. For additional retransmissions, new bit arrangements may be used. After a certain number of retransmissions, all the bit arrangements may be reused, until an acknowledgement is received or the number of retransmissions reaches the upper limit. Bit rearranger 908 may comprise a bit interleaver for bit interleaving (as shown in FIG. 10(a)) and a bit inverter for bit inversion (as shown in FIG. 10(b)). However, one circuit unit or one piece of software code may perform both bit interleaving and bit inversion.

FIGS. 11(a)-11(d) show particular examples of bit rearrangements. The bit rearrangements shown in FIGS. 11(a)-11(d) provide 4 different bit arrangements for 4 transmissions. If additional transmissions are necessary, then the 4 bit arrangements will be reused in rotation, until an acknowledgement is received or the number of retransmissions reaches the upper limit.

Referring to FIG. 11(a), it is assumed that there are 16 coded bits, $b_0, b_1, \ldots, b_{15}$, grouped into 4 modulation symbols with 4 bits per symbol. The 4 bits in each symbol modulate two orthogonal carriers according to the 16-QAM modulation scheme.

FIG. 11(b) illustrates the construction of the bit rearrangement for the first retransmission. In particular, the bits within each symbol are rearranged through interleaving and inverting. Then, the bits are cyclicly shifted by one symbol length, i.e., 4 bits, to result in the bit arrangement for the first retransmission.

FIG. 11(c) illustrates the construction of the bit rearrangement for the second retransmission. In particular, the bits within each symbol in the original transmission are rearranged by inverting certain bits. Then, the bits are cyclicly shifted by two symbol lengths, i.e., 8 bits, to result in the bit arrangement for the second retransmission.

Figure 11D:
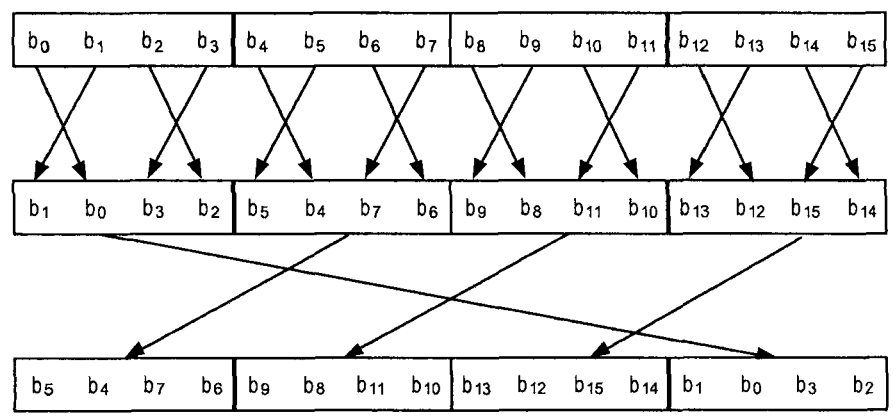

FIG. 11(d) illustrates the construction of the bit rearrangement for the third retransmission. In particular, the bits within each symbol in the original transmission are rearranged through interleaving. Then, the bits are further rearranged by interleaving the symbols. Then, the bits are cyclicly right-shifted by three symbol lengths, i.e., 12 bits, to result in the bit arrangement for the third retransmission.

The bit rearrangement shown in FIGS. 11(a)-11(d) balances bit reliabilities across multiple symbols by rearranging the symbols, while the bits are also rearranged within the respective symbols.

Bit rearrangement can also be realized by regrouping the bits into different symbols and/or interleaving and inverting the bits. In a particular example, each bit in a bit stream is shifted by a number of bits between two successive transmissions, and all the bits in that bit stream are not necessarily shifted by the same amount. Table 3 below gives an exemplary configuration of the amount of shift for each bit in the retransmissions.

TABLE 3

| Position in First Transmission mod 4 | First Retransmission | Second Retransmission | Third Retransmission |
| --- | --- | --- | --- |
| 1 | 4 | 8 | 16 |
| 2 | 8 | 16 | 4 |
| 3 | 12 | 4 | 20 |
| 0 | 16 | 12 | 8 |

The first column, titled "Position in First Transmission mod 4," shows the remainder after the position of the concerned bit in the original transmission is divided by 4, and the second through fourth columns show the corresponding amount of circular shift for each of the retransmissions. For example, the first bit in the original transmission has a bit position of 1, and therefore corresponds to the first row under the headers in Table 3, as 1 mod 4=1. Therefore, the first bit will be shifted by 4 bits between the original transmission and the first retransmission, and by 8 bits between the original transmission and the second retransmission, etc. Similarly, the $8^{th}$ bit in the original transmission corresponds to the fourth row in the table, and the $14^{th}$ bit in the original transmission corresponds to the second row in the table, etc.

FIG. 12 shows the inter-symbol bit rearrangement with bit regrouping according to the bit positions in Table 3. As shown in FIG. 12, the original transmission contains groups of 4 bits, i.e., a group of bits 1, 2, 3, 4, a group of bits 5, 6, 7, 8, etc. The first bits of the groups in the original transmission, i.e., bits 1, 5, 9, ..., are shifted by 4 bits for the first retransmission, and are shifted by 8 bits for the second retransmission. The second bits of the groups in the original transmission, i.e., 2, 6, 10, ..., are shifted by 8 bits for the first retransmission, and are shifted by 16 bits for the second retransmission. The third bits of the groups, i.e., bits 3, 7, 11, ..., in the original transmission are shifted by 12 bits for the first retransmission, and are shifted by 4 bits for the second retransmission. The fourth bits of the groups in the original transmission, i.e., bits 4, 8, 12, ..., are shifted by 16 bits for the first retransmission, and are shifted by 12 bits for the second retransmission.

The inter-symbol bit rearrangement with bit regrouping shown in FIG. 12 and Table 3 may be combined with intra-symbol bit rearrangement that interleaves and/or inverts certain bits within each symbol.

Further, inter-symbol bit rearrangement may be achieved with a combination of operations including intra-symbol bit rearrangement, bit separation, bit interleaving, bit grouping, inter-symbol bit interleaving, and symbol rearrangement/interleaving. The combination is not limited in any particular manner, but rather the operations may be performed in any desirable order, multiple operations may be combined into a single logical step, and any operation may be performed more than once. In addition, the operations may change for different numbers of retransmissions.

Figure 13:
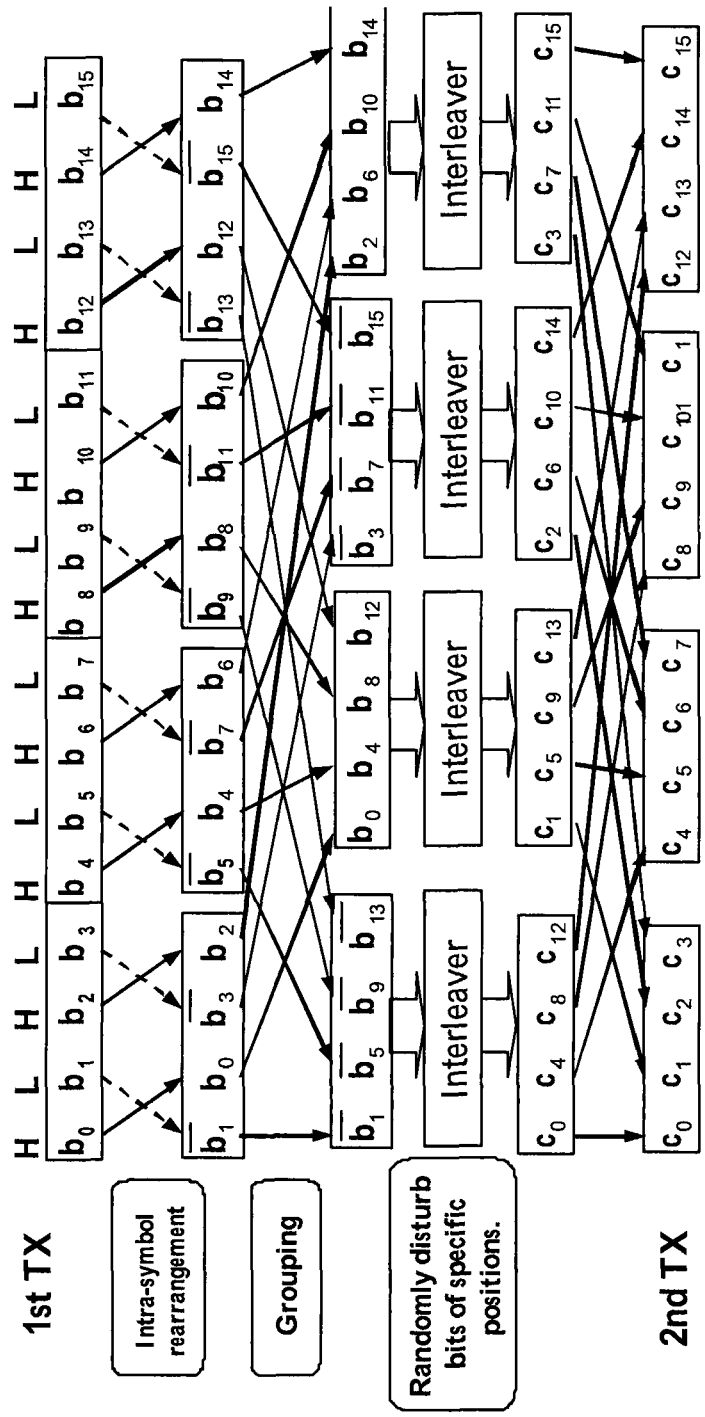
FIG. 13 illustrates an exemplary inter-symbol bit rearrangement according to exemplary embodiments.

FIG. 13 illustrates an example of inter-symbol bit rearrangement that includes the multiple operations enumerated above. In particular, to construct the bits for a retransmission, the coded bits in a previous transmission first go through intra-symbol bit rearrangement, i.e., intra-symbol interleaving and/or inversion. Then, the bits are separated into several groups. Within each group, the bits are further interleaved. Finally, the bits are arranged to form new groups constituting a new sequence for the retransmission.

In the particular example shown in FIG. 13, 16-QAM modulation is adopted, and the coded bits are separated into groups of 4 bits. Within each group, the four bits are interleaved such that the first bit (e.g., $b_0, b_4, \ldots$) becomes the second bit, the second bit (e.g., $b_1, b_5, \ldots$) becomes the first bit, the third bit (e.g., $b_2, b_6, \ldots$) becomes the fourth bit, and the fourth bit (e.g., $b_3, b_7, \ldots$) becomes the third bit. Then, the new first and third bits (e.g., $b_1, b_3, \ldots$) of each group are logically inverted. Then, the four bits within each group are respectively placed into four groups, such that the first bits (e.g., $\overline{b}_1, \overline{b}_5, \ldots$) form a first group, the second bits (e.g., $b_0, b_4, \ldots$) form a second group, etc. Within each of the four groups, the bits are further interleaved, resulting in four sequences, the first group having a sequence of $c_0, c_4, c_8, c_{12}, c_{16}$ (not shown), etc., the second group having a sequence of $c_1, c_5, c_9, c_{13}, c_{17}$ (not shown), etc., the third group having a sequence of $c_2, c_6, c_{10}, c_{14}, c_{18}$ (not shown), etc., and the four group having a sequence of $c_3, c_7, c_{11}, c_{15}, c_{19}$ (not shown), etc.

Then, bits from the four sequences are further regrouped to form a single retransmission sequence containing groups of 4 bits. In particular, the first group in the retransmission sequence contains bits $c_0, c_1, c_2, c_3$, the second group in the retransmission sequence contains bits $c_4, c_5, c_6, c_7$, etc.

Additional retransmissions may each adopt a different combination of the enumerated operations, and after all the configurations are exhausted, they may be reused if additional retransmissions are necessary, until an acknowledgement is received or the number of retransmissions reaches a limit.

Figure 14A:
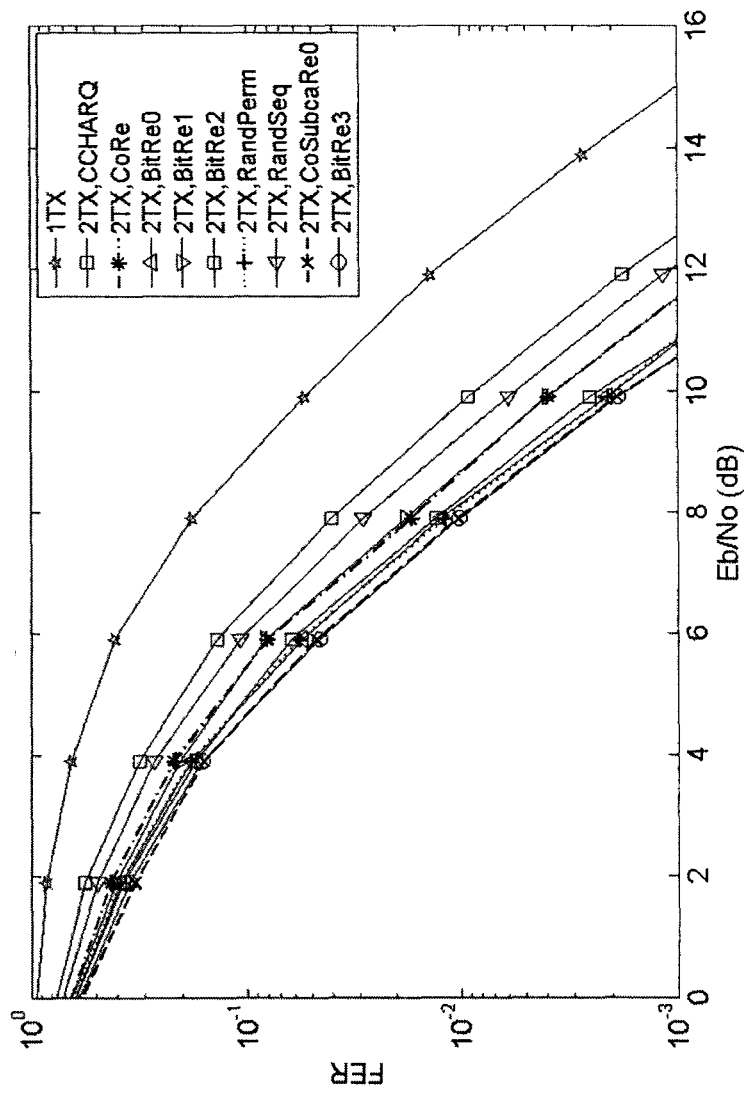
FIGS. 14(a)-14(c) show simulation results of several different HARQ schemes including ones according to exemplary embodiments.
Figure 14:
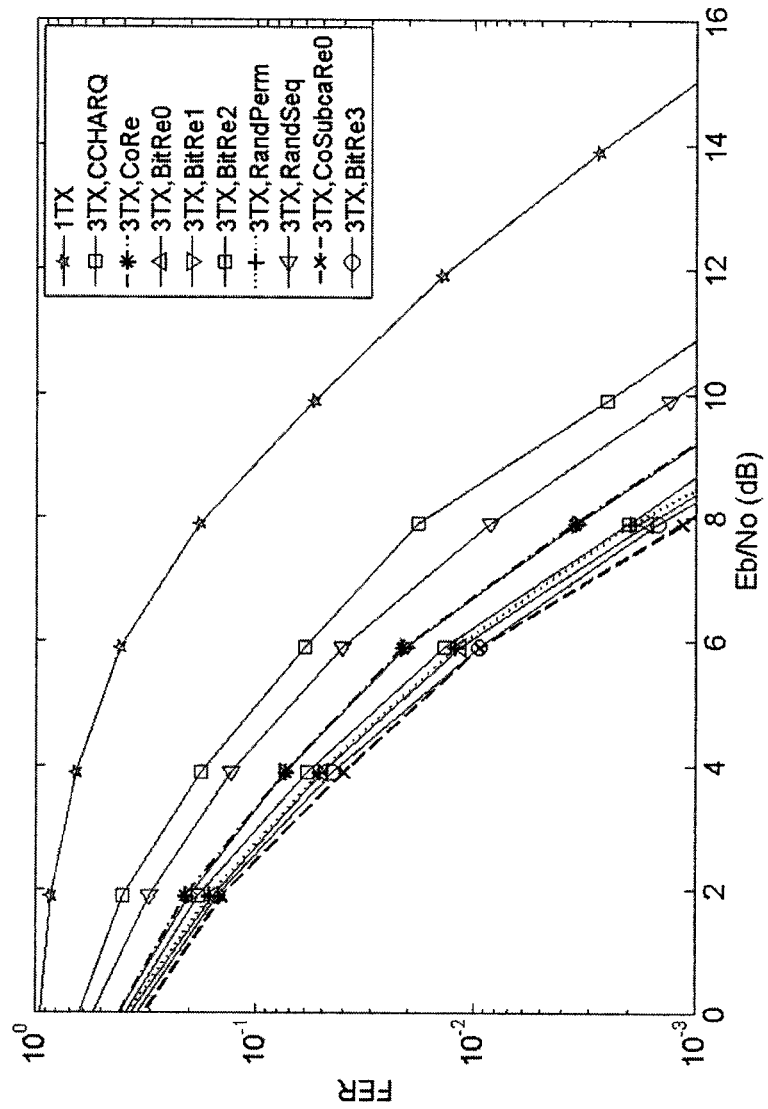
Figure 14C:
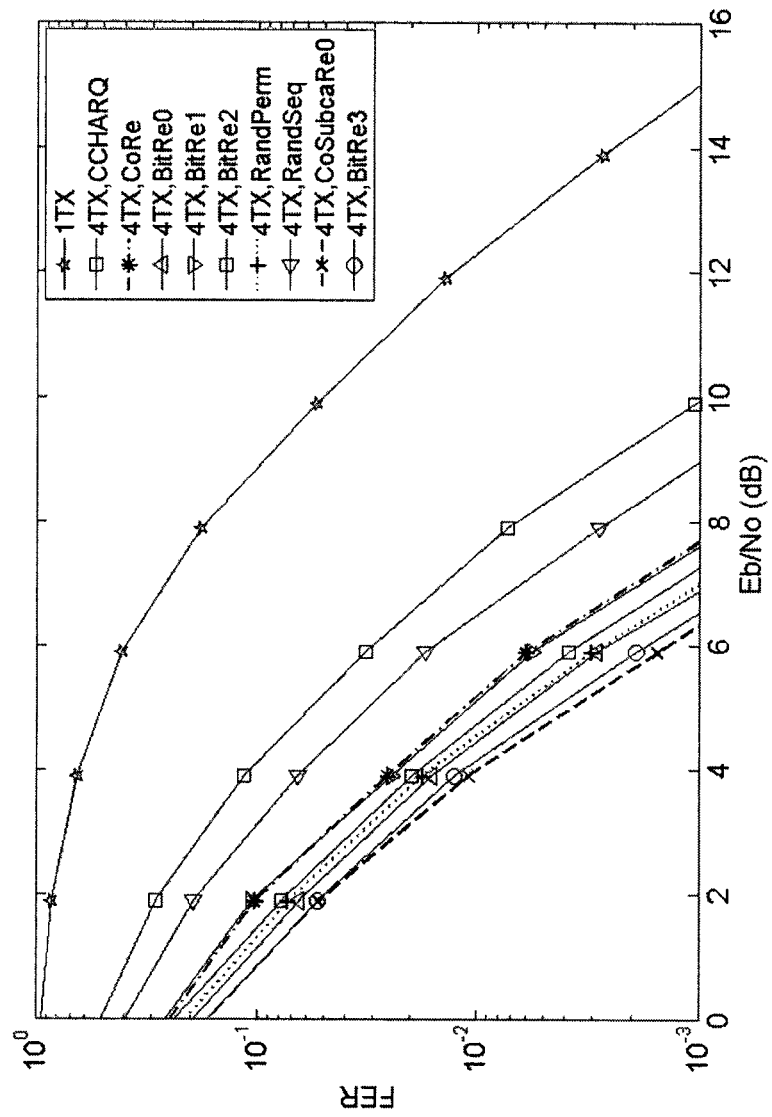
Figure 15A:
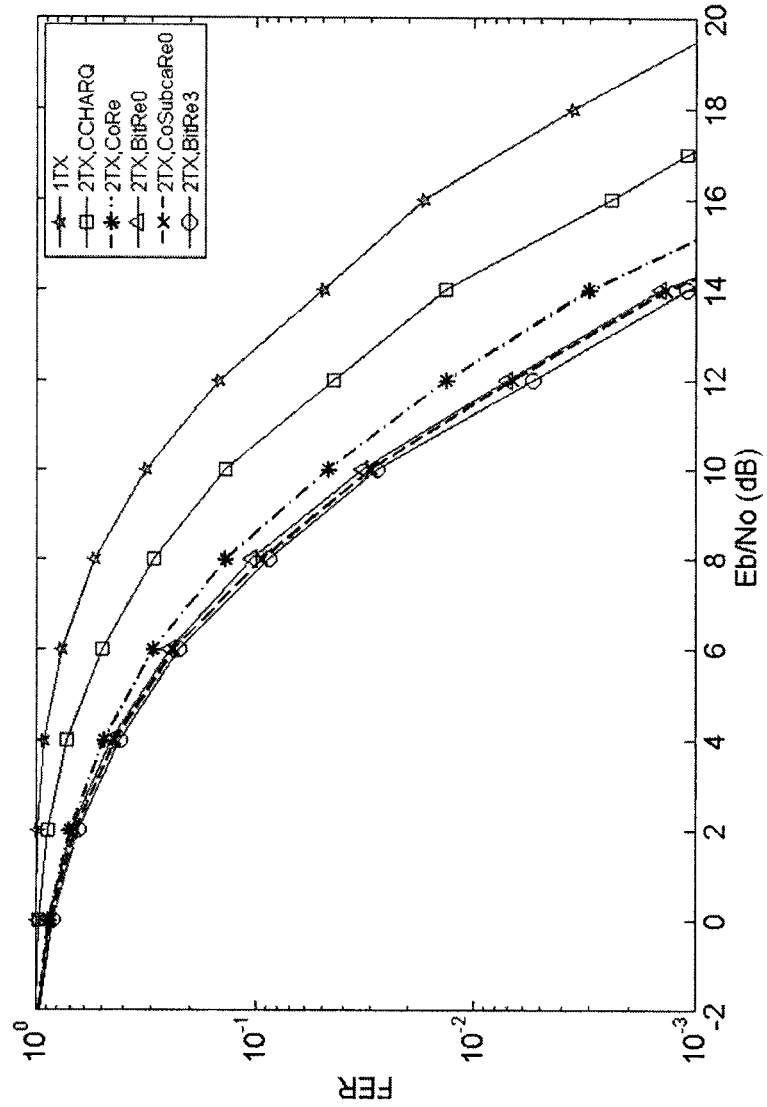
FIGS. 15(a)-15(e) show additional simulation results of several different HARQ schemes including ones according to exemplary embodiments.
Figure 15B:
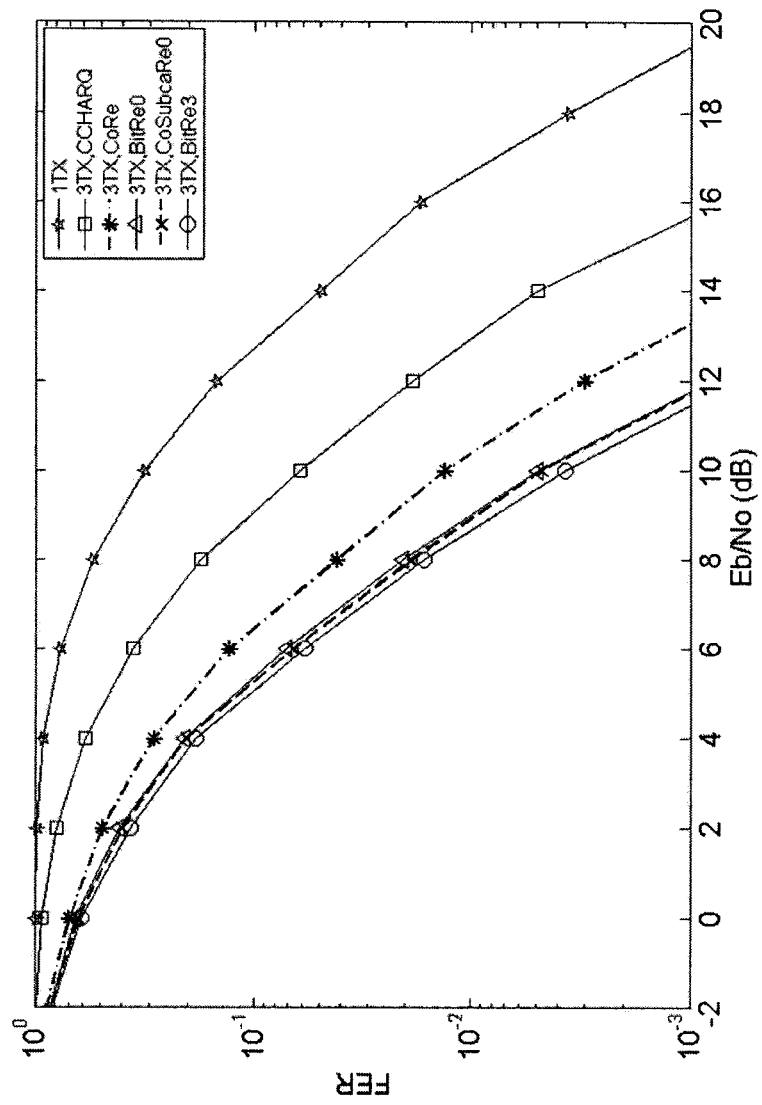
Figure 15C:
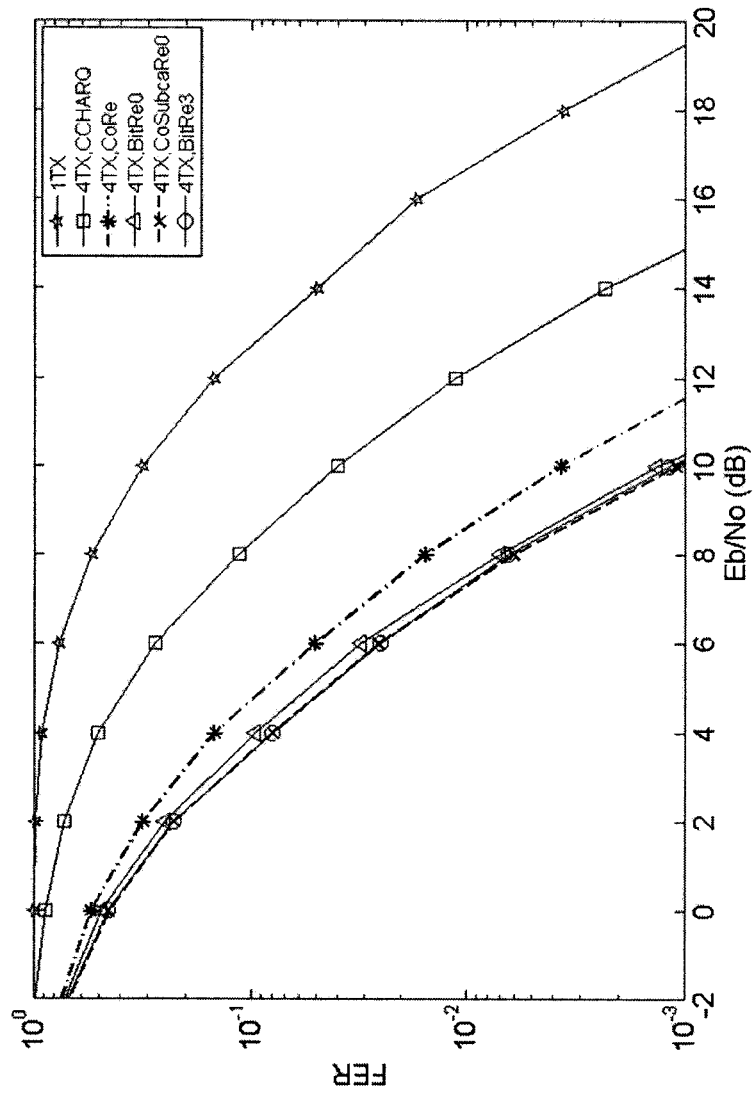
Figure 15D:
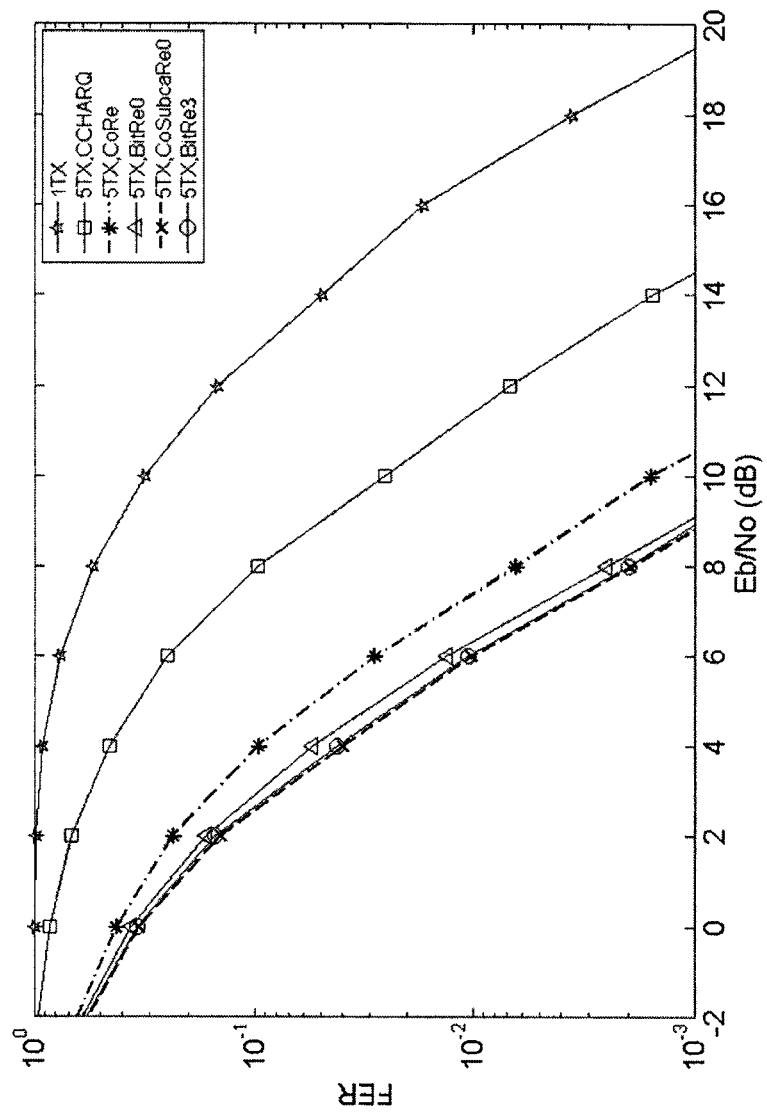
Figure 15E:
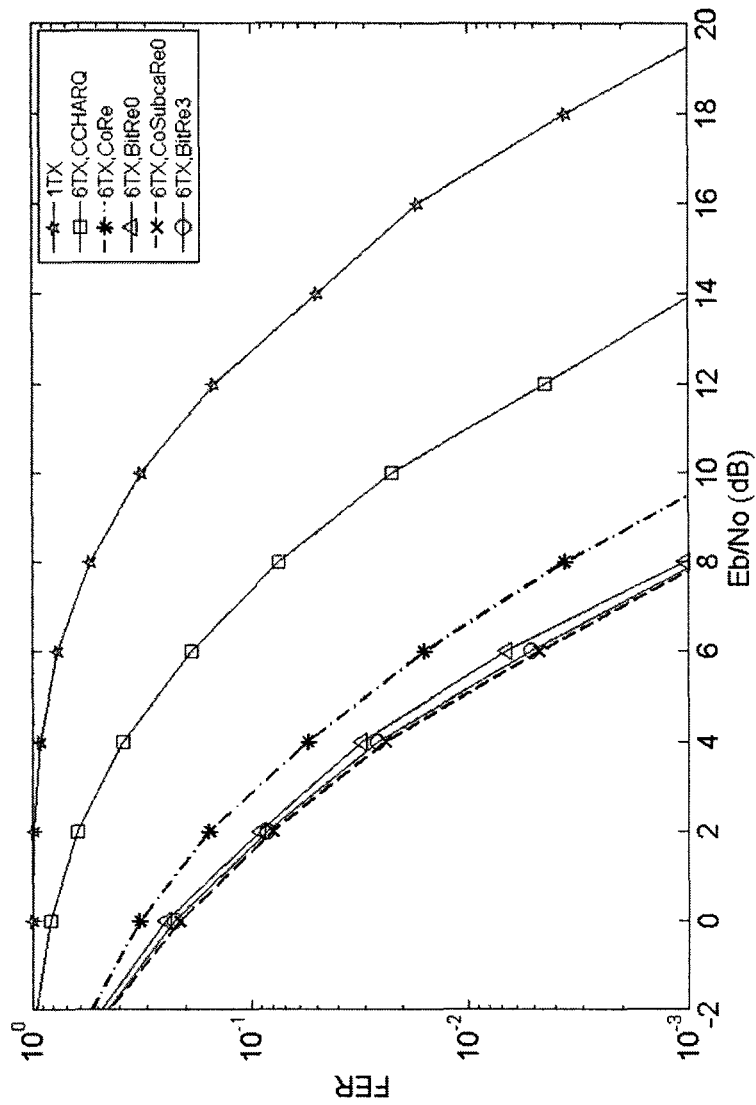

FIGS. 14(a)-14(c) show simulation results of nine different HARQ schemes, seven of which are provided in FIGS. 10(a)-10(c), 11(a)-11(d), 12, and 13. 1TX, 2TX, 3TX, 4TX refer to the transmission and retransmissions, CCHARQ refers to chase combining HARQ without constellation/bit rearrangement, CoRe refers to simple constellation rearrangement shown in FIGS. 5(a)-5(d) and Table 1, BitRe0 refers to the inter-symbol bit rearrangement shown in FIG. 10(c), BitRe1 refers to the inter-symbol bit rearrangement shown in FIG. 11(a)-11(d), BitRe2 refers to the inter-symbol bit rearrangement shown in FIG. 12 and Table 3, BitRe3 refers to the inter-symbol bit rearrangement shown in FIG. 13, RandPerm refers to inter-symbol bit interleaving shown in FIG. 10(a), RandSeq refers to the bit inversion scheme shown in FIG. 10(b), and CoSubcaRe0 refers to a combination of the constellation rearrangement shown in FIGS. 5(a)-5(d) and the subcarrier rearrangement which randomly rearranges the subcarriers. The data bits are encoded using a convolutional turbo code with a coding rate R=1/2, and the modulation scheme is 16-QAM. The simulation was run for 8 iterations of decoding process. FIGS. 14(a)-14(c) show the frame error rate (FER) as the vertical axis and the bit energy to noise ratio (Eb/No) as the horizontal axis. FIG. 14(a) illustrates the performance of the nine schemes on the first retransmission, FIG. 14(b) illustrates the performance of the nine schemes on the second retransmission, and FIG. 14(c) illustrates the performance of the nine schemes on the third retransmission.

As FIGS. 14(a)-14(c) show, the inter-symbol bit rearrangements shown in FIGS. 10(a)-10(c), 11(a)-11(d), 12, and 13 have comparable performance as compared to methods of constellation rearrangement, subcarrier rearrangement, or the combination thereof.

FIGS. 15(a)-15(e) show additional simulation results of five different HARQ schemes with 64-QAM modulation, including plain chase combining (CCHARQ), constellation rearrangement (CoRe) as shown in FIGS. 7(a)-7(f) and Table 2, the inter-symbol bit rearrangement shown in FIG. 10(c) (BitRe0), combination of constellation rearrangement shown in FIGS. 7(a)-7(f) and subcarrier rearrangement that randomly rearranges the subcarriers (CoSubcaRe0), and the inter-symbol bit rearrangement shown in FIG. 13 (BitRe3). The data bits are coded using a convolutional turbo code with a coding rate R=1/2, and the modulation scheme is 64-QAM. The turbo decoding was run for 8 iterations. FIGS. 15(a)-15(e) show the simulation results of the second through sixth transmissions, i.e., the five retransmissions.

As FIGS. 15(a)-15(e) show, the inter-symbol bit rearrangements have comparable performance as compared to the other methods of constellation rearrangement, subcarrier rearrangement, or the combination thereof. For certain retransmissions, the inter-symbol bit rearrangements consistent with exemplary embodiments have even better performance than these other methods.

Consistent with exemplary embodiments, there is also provided a method of inter-symbol bit rearrangement based on bit units in $2^M$-QAM modulation. More specifically, a bit unit consists of the M/2 bits that together modulate one of the two carriers. Take 16-QAM as an example. An I-unit includes the two bits that modulate the in-phase carrier, and a Q-unit includes the two bits that modulate the quadrature carrier. As an example, FIG. 16 shows a stream of 20 bits grouped into 5 symbols. Each symbol includes 4 bits further grouped into two units. Thus, from the leftmost bit, the first I-unit includes bits $b_0$ and $b_1$ for modulating the in-phase carrier, the first Q-unit includes bits $b_2$ and $b_3$ for modulating the quadrature carrier, the second I-unit includes bits $b_4$ and $b_5$ for modulating the in-phase carrier, and so on.

In one aspect, the inter-symbol bit rearrangement is achieved through constellation rearrangement followed by separately interleaving the I-units and the Q-units. For example, the 10 I-units shown in FIG. 16 can be pseudorandomly permutated with one another, and the 10 Q-units can also be pseudorandomly permutated with one another. The two steps, i.e., constellation rearrangement and separate couple permutation, can be implemented as separate steps or a single step, and can be implemented in separate circuit blocks or separate pieces of software code or in a single circuit block or a single piece of software code.

In another aspect, the inter-symbol bit rearrangement can be achieved through constellation rearrangement followed by mixed interleaving of the I-units and Q-units. In other words, after the interleaving, an I-unit may become a Q-unit to modulate the quadrature carrier, and vice versa.

If the modulation scheme is other than $2^M$-QAM (M=2, 4, 6, . . . ), bit units can be defined in a similar manner such that each bit unit includes all of the bits in a modulation symbol that together modulate one of the in-phase carrier and the quadrature carrier. Consistent with exemplary embodiments, separate interleaving or mixed interleaving of the I-units and Q-units separately may be performed to improve efficiency.

Figure 17:
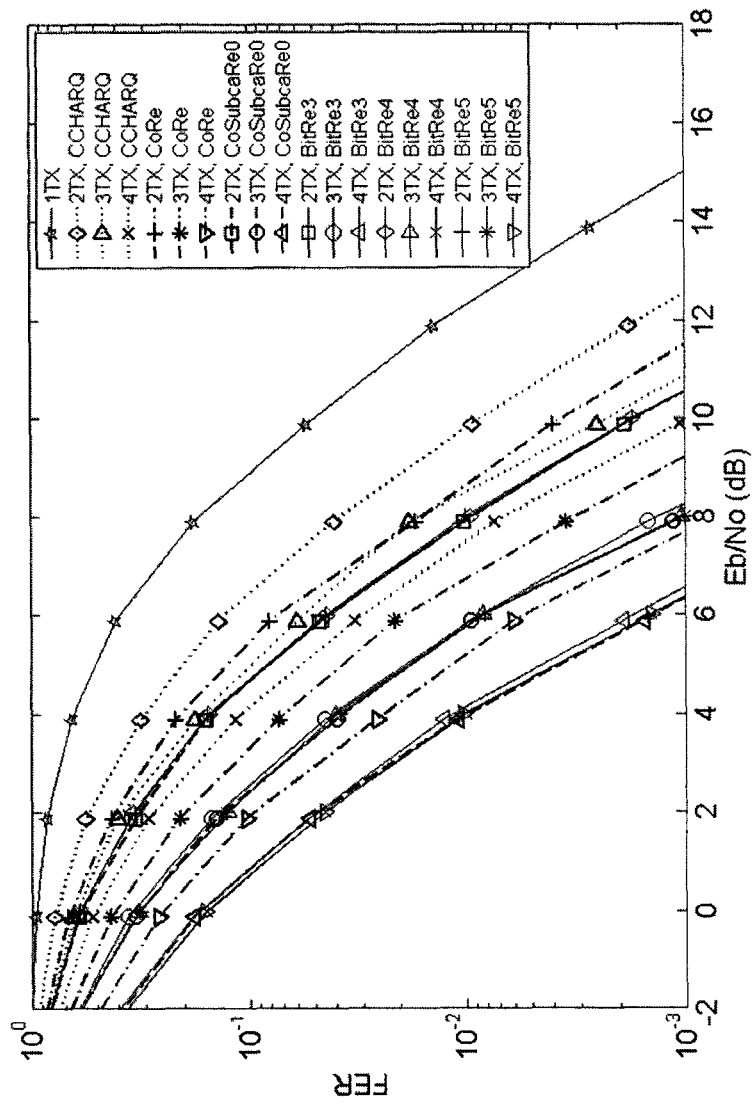
FIG. 17 shows simulation results comparing several HARQ schemes including ones according to exemplary embodiments.

FIG. 17 shows simulation results comparing the HARQ schemes with the bit rearrangement methods consistent with exemplary embodiments against the prior HARQ schemes. Particularly, BitRe4 refers to the separate interleaving of the Q-couples and the I-couples discussed above in association with FIG. 16, and BitRe5 refers to the mixed interleaving of the Q-couples and I-couples also discussed above in association with FIG. 16. Other symbols, i.e., CCHARQ, CoRe, CoSubcaRe0, BitRe3, 1TX, 2TX, etc., have the same meaning as in previously described figures. The simulation results shown in FIG. 17 suggest that the interleaving of the Q-couples and I-couples, either separate or mixed, have comparable performance as compared to other HARQ methods.

Consistent with exemplary embodiments, there is further provided an inter-symbol bit rearrangement method that rearranges bits across subcarrier boundaries in an OFDM system, which may be referred to as inter-subcarrier bit rearrangement. In accordance with such embodiments, a bit stream is first grouped into modulation symbols based on the modulation scheme, e.g., 2 bits per symbol for basic quadrature modulation, 4 bits per symbol for 16-QAM, and 6 bits per symbol for 64-QAM, etc. The symbols are then converted into parallel streams, each stream to modulate a respective one of multiple OFDM subcarriers. FIG. 18(a) gives a specific example for 16-QAM. A bit stream contains 16 encoded bits, $b_0$, $b_1$, $b_2$, . . . , $b_{15}$. The 16 bits are grouped into 4 modulation symbols with 4 bits in each symbols. Thus, $b_0$, $b_1$, $b_2$, $b_3$ modulate the first OFDM subcarrier, $b_4$, $b_5$, $b_6$, $b_7$ modulate the second OFDM subcarrier, $b_8$, $b_9$, $b_{10}$, $b_{11}$ modulate the third OFDM subcarrier, and $b_{12}$, $b_{13}$, $b_{14}$, $b_{15}$ modulate the fourth OFDM subcarrier. The 4 parallel symbols over the four OFDM subcarriers are referred to as one OFDM symbol.

The method proposed by Beh et al., as discussed above, reassigns each symbol to a different subcarrier for each retransmission. However, consistent with exemplary embodiments, the encoded bits are rearranged such that not only the symbols are carried over different OFDM subcarriers for each retransmission, but the bits are shifted and, optionally, inverted such that each symbol contains a different group of bits from transmission to transmission. In addition, over retransmissions, the same bits may map to different positions on the constellation diagram with different reliabilities. For example, if the first transmission consists of the bit stream shown in FIG. 18(a), the configuration shown in FIG. 18(b) may be used for the first retransmission. Particularly, compared to FIG. 18(a), the bits in FIG. 18(b) have been cyclicly shifted by 9 bits, and every other bit has been inverted. For example, the first bit, $b_0$, has changed position from the first bit in FIG. 18(a) to the tenth bit in FIG. 18(b). If the first bit in the stream modulates the phase of the in-phase part of the first OFDM subcarrier, then the tenth bit modulates the amplitude of the in-phase part of the third OFDM subcarrier. As a result, the same bits are now carried over a different OFDM subcarrier, and also have different reliabilities. In other words, the retransmission pattern shown in FIG. 18(b) provides the benefits of both constellation rearrangement and subcarrier rearrangement.

If additional retransmission patterns are desired, the bits may be further rearranged. For example, FIG. 18(c) and FIG. 18(d) show two retransmission bit patterns that may be used for the second and third retransmissions, respectively.

The bit rearrangements shown in FIGS. 18(a)-18(d) are only specific examples. Other modulation schemes may also be practiced. For example, assuming a data packet contains N coded bits to be transmitted over Ts OFDM symbols, and the OFDM subcarriers are divided into Fn sections, each section including one or more OFDM subcarriers, a fundamental shift value s is defined as:

$$s = \lfloor N/(Fn \cdot Ts \cdot (m/2)) \rfloor \cdot (m/2),$$

where $\lfloor \rfloor$ is a floor function, with $\lfloor x \rfloor$ being the greatest integer not greater than x, and m is the modulation order, where m=2 for QPSK, m=4 for 16-QAM, and m=6 for 64-QAM. Then, the shift value of the bits in the retransmissions with respect to the original transmission may be defined for QPSK by the following formula (1):

$$\text{shift} = \begin{cases} 0, & \text{if } n = 1 \\ 2s, & \text{if } n = 2 \\ 3s, & \text{if } n = 3 \\ s, & \text{if } n = 0 \end{cases} \quad (1)$$

where n=TX_No mod 4, and TX_No is the index number of the transmission. Assuming the coded bits spread over just one OFDM symbol containing 8 symbols each including 2 bits modulating one of 8 subcarriers according to the QPSK scheme, then N=16, Ts=1, and m=2. Further assuming the 8 subcarriers are divided into 4 sections, then Fn=4. Based on these assumptions, $s=\lfloor 16/(4\cdot 1\cdot(2/2))\rfloor\cdot(2/2)=4$. Thus, the 4th transmission will have the bits shifted by 4 bits with respect to the first transmission, while the 3rd transmission will have the bits shifted by 12 bits with respect to the first transmission.

FIG. 19 illustrates a bit rearrangement scheme according to formula (1). In particular, 8 OFDM subcarriers carry 16 information bits, $b_0, b_1, \ldots, b_{15}$, in each OFDM symbol. In the original transmission, bits $b_0$ and $b_1$ modulate the first subcarrier, bits $b_2$ and $b_3$ modulate the second subcarrier, etc. In the 2nd transmission, however, the first bit, $b_0$, has been shifted by 8 bits, and become the 9 th bit. In the 3rd transmission, the first bit, $b_0$, has been further shifted by 4 bits, and become the 12th bit.

As a further example, for a 16-QAM, the shift values may be given by formula (2):

$$\text{shift} = \begin{cases} 0, & \text{if } n = 1 \\ 2s+1, & \text{if } n = 2 \\ 3s, & \text{if } n = 3 \\ s+1, & \text{if } n = 0 \end{cases} \quad (2)$$

where n=TX_No mod 4. In addition, bits at bit positions with relatively lower bit reliabilities, for example, the bits modulating the amplitude of carrier waves, may be inverted to obtain constellation diversity. For example, if n=2 or 3, the bits at odd positions, i.e., $b_0, b_2, b_4, \ldots$, are logically inverted. Assuming the coded bits spread over just one OFDM symbol containing 4 symbols each including 4 bits modulating one of 4 subcarriers according to the 16-QAM scheme, then N=16, Ts=1, and m=4. Also assuming the 4 subcarriers are divided into 4 sections with one subcarrier per section, then Fn=4. Thus, $s=\lfloor 16/(4\cdot 1\cdot(4/2))\rfloor\cdot(4/2)=4$. The configuration shown in FIGS. 18(a)-18(d) is consistent with formula (2) and the bit inversion described above.

For 64-QAM, the shift values may be given by formula (3):

$$\text{shift} = \begin{cases} 0, & \text{if } n = 1 \\ 2s+2, & \text{if } n = 2 \\ 3s+1, & \text{if } n = 3 \\ s, & \text{if } n = 4 \\ 2, & \text{if } n = 5 \\ 2s+1, & \text{if } n = 0 \end{cases} \quad (3)$$

where n=TX_No mod 6. In addition, bits at bit positions with relatively lower bit reliabilities, for example, the bits modulating the amplitude of carrier waves, may be inverted to obtain constellation diversity. For example, if n=4, 5, or 0, the last two bits in every three consecutive bits are logically inverted. Assuming the coded bits spread over just one OFDM symbol containing 4 symbols each including 6 bits modulating one of 4 subcarriers according to the 64-QAM scheme, then N=24, Ts=1, and m=6. Also assuming the 4 subcarriers are divided into 4 sections with one subcarrier per section, then Fn=4. Thus, $s=\lfloor 24/(4\cdot 1\cdot(6/2))\rfloor\cdot(6/2)=6$. FIG. 20 shows the bit rearrangements according to formula (3) and the bit inversion described above. In the top row, H, M, L indicate the relative positions of the bits within each symbol, where H refers to the bit positions with the highest bit reliabilities, L refers to the bit positions with the lowest bit reliabilities, and M refers to the bit positions with intermediate bit reliabilities. As FIG. 20 shows, between transmissions, the reliability of a bit generally changes between H, M, and L.

Alternatively, if the coded bits are grouped into 6 symbols with 6 bits per symbol, i.e., 36 bits per OFDM symbol carried by 6 OFDM subcarriers using 64-QAM, then N=36, Ts=1, m=6, and Fn=6. Thus, $s=\lfloor 36/(6\cdot 1\cdot(6/2))\rfloor\cdot(6/2)=6$. The following formula (4) may be used:

$$\text{shift} = \begin{cases} 0, & \text{if } n = 1 \\ 3s+2, & \text{if } n = 2 \\ 4s+1, & \text{if } n = 3 \\ s, & \text{if } n = 4 \\ 5s+2, & \text{if } n = 5 \\ 2s+1, & \text{if } n = 0 \end{cases} \quad (4)$$

where n=TX_No mod 6. In addition, bits at bit positions with relatively lower bit reliabilities, for example, the bits modulating the amplitude of carrier waves, may be inverted to obtain constellation diversity. For example, if n=4, 5, or 0, the last two bits in every three consecutive bits are logically inverted. FIG. 21 shows the bit rearrangements according to formula (4) and the bit inversion described above.

Figure 4:
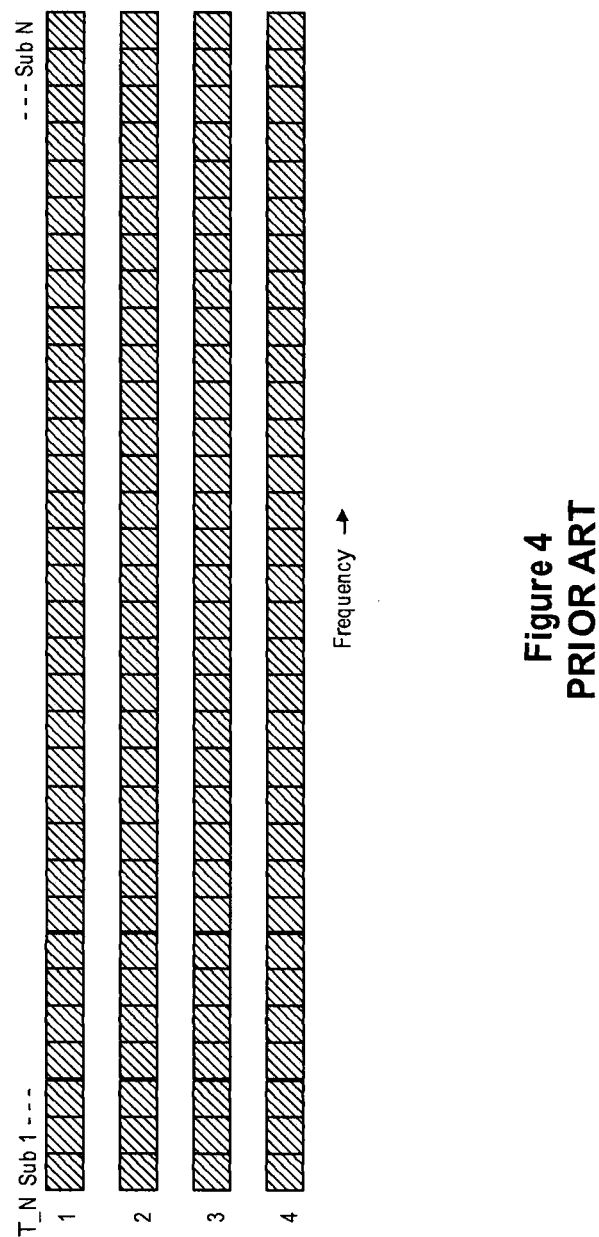
FIG. 4 shows a method of subcarrier rearrangement for a hybrid ARQ scheme.
Figure 22:
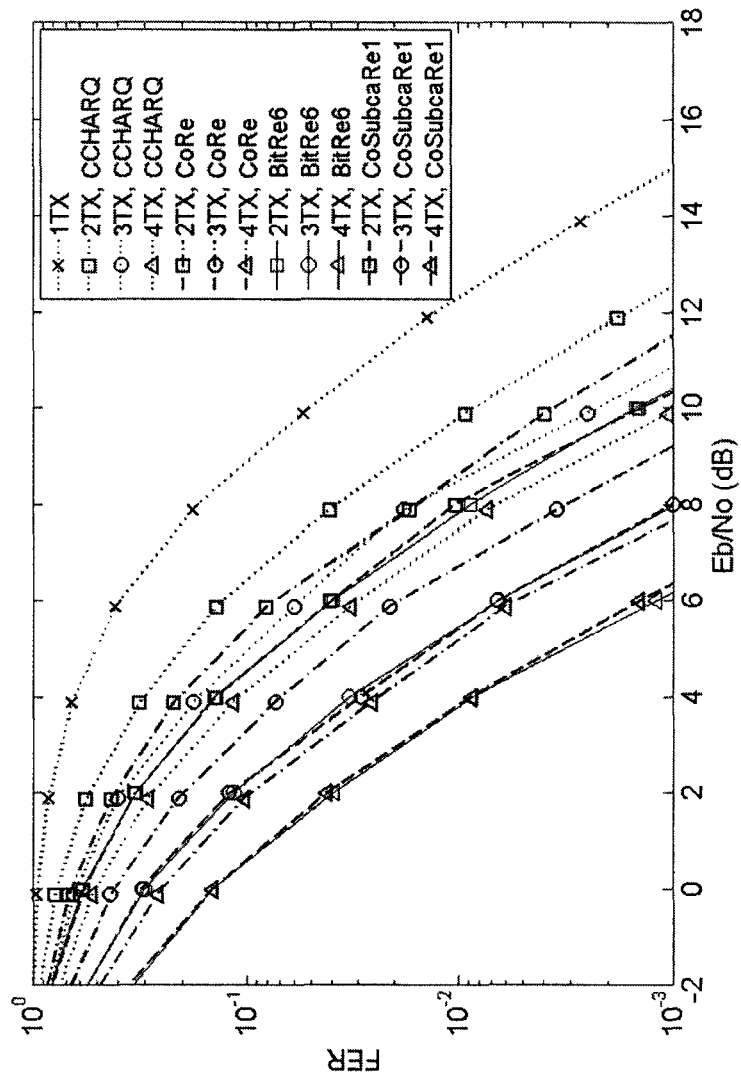
FIG. 22 shows simulation results of several hybrid ARQ schemes including ones according to exemplary embodiments.
Figure 23:
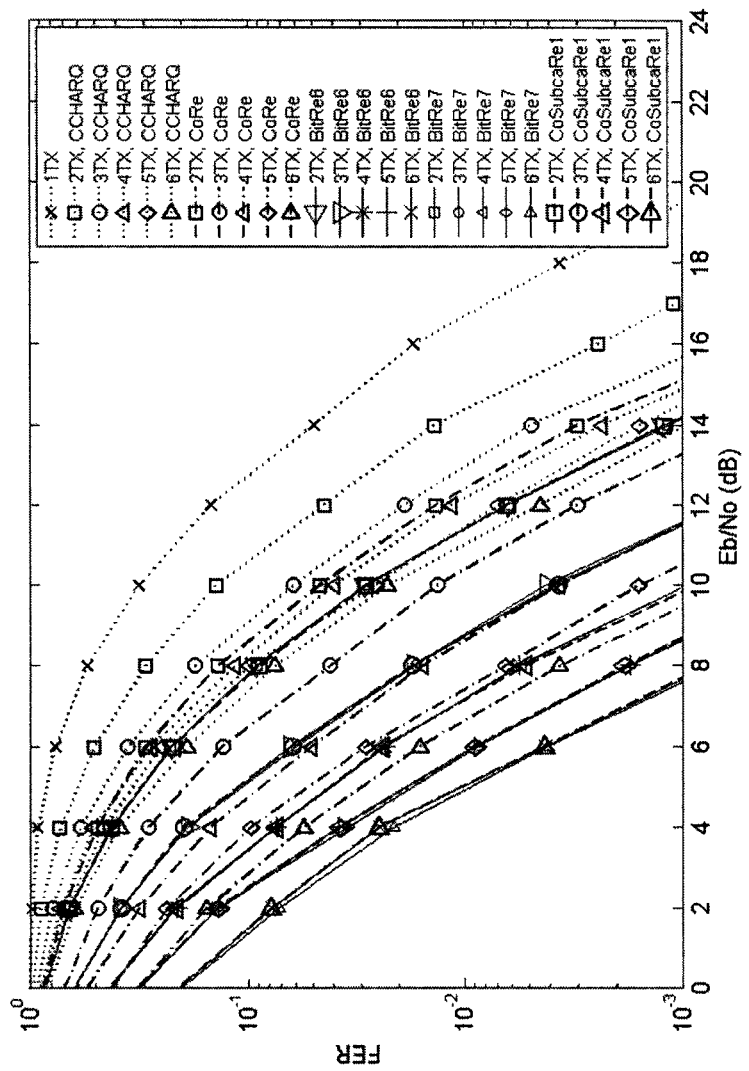
FIG. 23 shows simulation results of several hybrid ARQ schemes including ones according to exemplary embodiments.

FIGS. 22 and 23 show simulation results comparing the HARQ schemes with the inter-subcarrier bit rearrangement methods against the other HARQ schemes. Particularly, BitRe6 refers to the bit rearrangement scheme shown in FIGS. 18(a)-18(d) and 20, and BitRe7 refers to the bit rearrangement scheme shown in FIG. 21, and CoSubcaRe1 refers to the combination of constellation rearrangement shown in FIGS. 5(a)-5(d) (for 16-QAM) or FIGS. 7(a)-7(f) (for 64-QAM) and subcarrier rearrangement shown in FIG. 4. Other symbols, i.e., CCHARQ, CoRe, CoSubcaRe1, BitRe3, 1TX, 2TX, etc., have the same meaning as those in the previously described figures. FIG. 22 shows simulation results of the 16-QAM scheme shown in FIGS. 18(a)-18(d) and FIG. 23 shows simulation results of the 64-QAM schemes shown in FIGS. 20 and 21. The simulation results shown in FIGS. 22 and 23 suggest that bit rearrangement schemes shown in FIGS. 18(a)-18(d), 20, and 21 have comparable or even better performance as compared to the other HARQ scheme.

The above configurations for bit rearrangements across OFDM subcarriers are only exemplary. The present invention is not limited to any of the examples given above. One skilled in the art would appreciate that a great number of other bit rearrangements can be made consistent with exemplary embodiments. For example, the shift of the bits for each retransmission may be calculated according to a different formula.

For example, when the system allows only 4 different bit arrangements, the formula given above for the 64-QAM modulation scheme is not an optimal solution. Rather, formula (2) may be used, or a different formula (5) as shown below may be used:

$$\text{shift} = \begin{cases} 0, & \text{if } n = 1 \\ 2s+1, & \text{if } n = 2 \\ 3s+2, & \text{if } n = 3 \\ s, & \text{if } n = 0 \end{cases} \quad (5)$$

where n=TX_No mod 4. In addition, bits at bit positions with relatively lower bit reliabilities, for example, the bits modulating the amplitude of carrier waves, may be inverted to obtain constellation diversity. For example, if n=0, the last two bits of every three consecutive bits are logically inverted.

The embodiments described above generally include bit shifting, interleaving, and/or inversion. It is to be understood, however, that not all of these operations are necessary to achieve diversity (frequency, space, or constellation). Rather, one or a combination of these operations may result in a satisfactory performance. For example, bit inversion can sometimes be omitted without sacrificing performance.

Further, exemplary embodiments are not limited to either the inter-subcarrier bit rearrangements illustrated in FIGS. 18(a)-18(d), 19-21 and formulae (1)-(5), or the inter-symbol bit rearrangements shown in FIGS. 10(a)-10(c), 11(a)-11(d), 12, 13, and 16. Combinations of any of the bit rearrangement schemes illustrated in these figures and described above are also consistent with exemplary embodiments. For example, the inter-subcarrier rearrangements shown in FIGS. 18(a)-18(d) and 19-21 and formulae (1)-(5) preserve the order of the original bit sequence. However, the bits may also be interleaved, as illustrated in FIGS. 10(a)-10(c), 11(a)-11(d), 12, 13, and 16.

Figure 1:
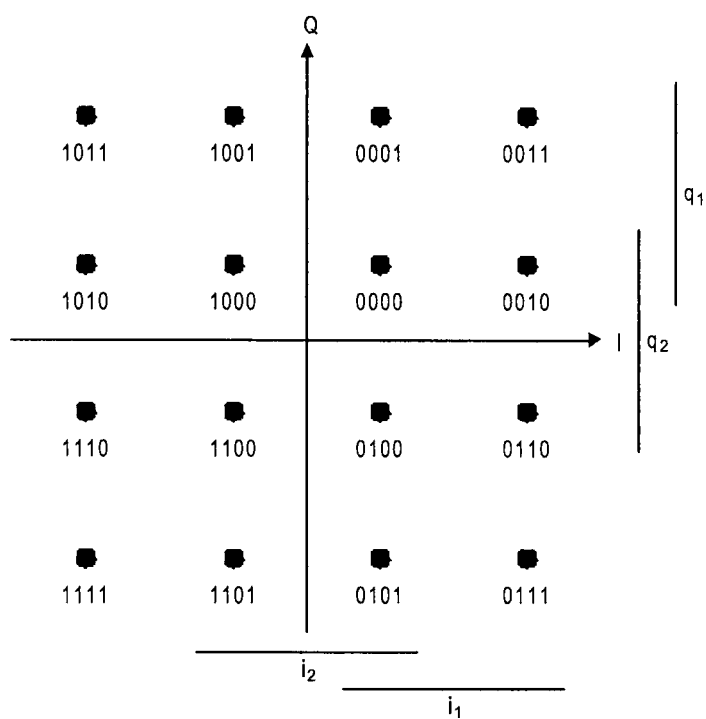
FIG. 1 illustrates an exemplary constellation diagram for a 16-QAM scheme.
Figure 2:
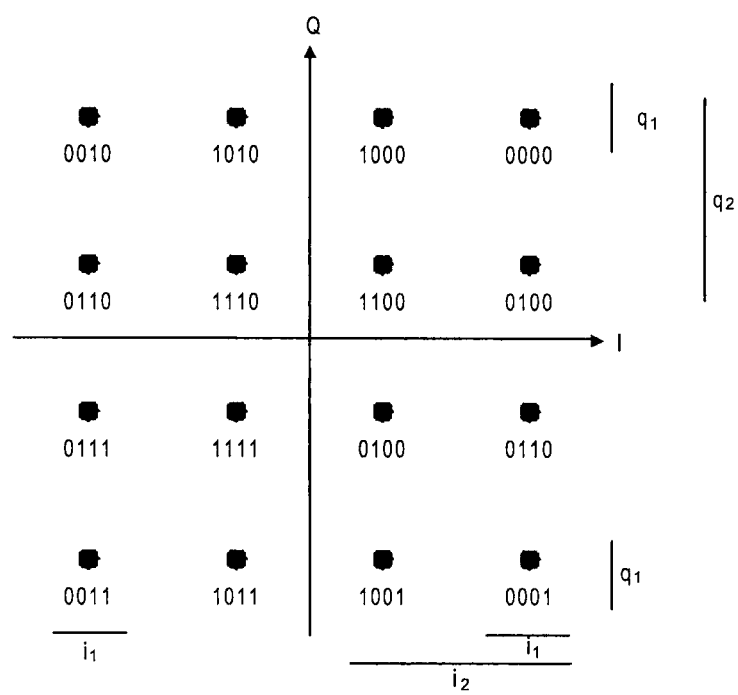
FIG. 2 shows a proposal by Panasonic to modify a constellation diagram for a hybrid ARQ scheme.
Figure 3A:
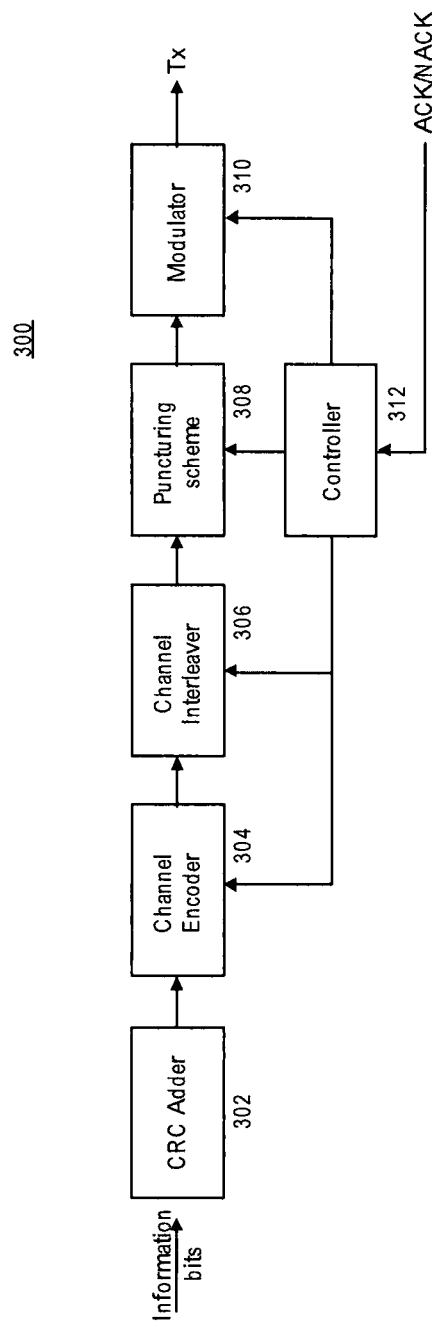
FIG. 3(a) shows portions of a transmitter for processing information bits and modulating a carrier wave according to the proposal by Panasonic.

The inter-symbol bit rearrangement, either on a single carrier, or across multiple OFDM subcarriers, can be implemented by modifying the hardware/software of existing systems. For example, transmitter 300 of FIG. 3(a) can be adapted to practice the HARQ schemes, as a transmitter 2400 shown in FIG. 24(a). More specifically, a CRC adder 2402 appends CRC bits to the information bits to provide for error detection at the receiver end, a channel encoder 2404 encodes the information bits appended with CRC bits, a channel interleaver 2406 rearranges the encoded bits to protect against burst errors and, optionally, punctures certain bits of the encoded and interleaved bits to increase throughput, an inter-symbol bit rearranger 2408 implements an inter-symbol bit rearrangement scheme, and a modulator 2410 modulates the carrier wave with the encoded, interleaved, punctured, and inter-symbol-rearranged information bits. A controller 2412 controls the inter-symbol bit rearrangement. Controller 2412 may act upon an acknowledgement signal or negative acknowledgement signal received from the other side of the channel indicating that the previous transmission was successful or not. Although not illustrated in FIG. 24(a), controller 2412 may also control the channel encoding, interleaving, puncturing, and modulation processes. Alternatively, additional controllers may be included in transmitter 2400 for controlling the channel encoding, interleaving, puncturing, and modulation processes.

Figure 3B:
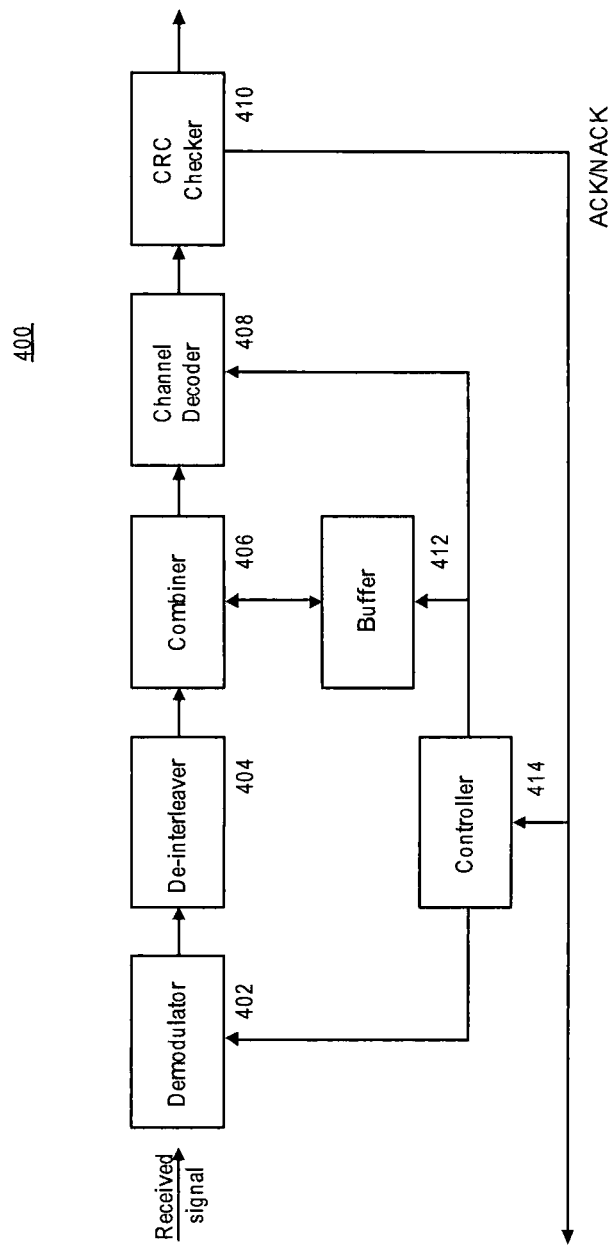
FIG. 3(b) shows portions of a receiver for processing signals received from a transmitter according to the proposal by Panasonic.
Figure 24A:
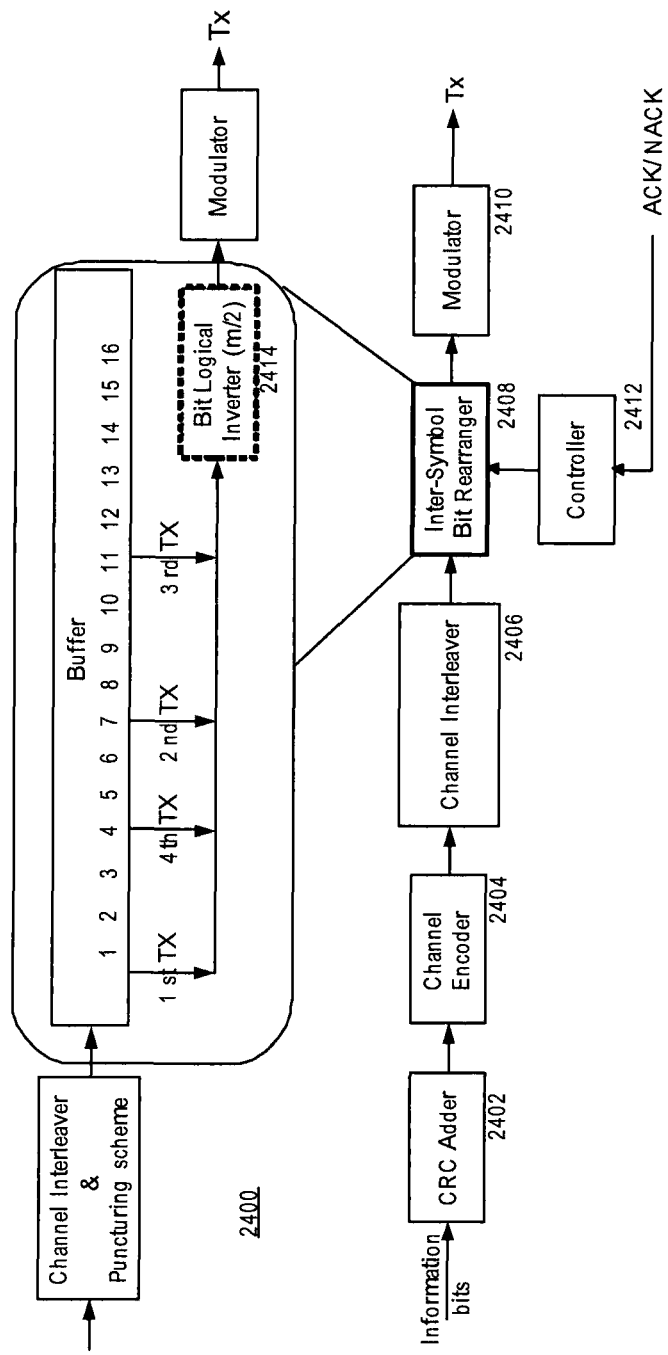
FIG. 24(a) shows portions of a transmitter adapted to practice hybrid ARQ schemes according to exemplary embodiments.
Figure 24B:
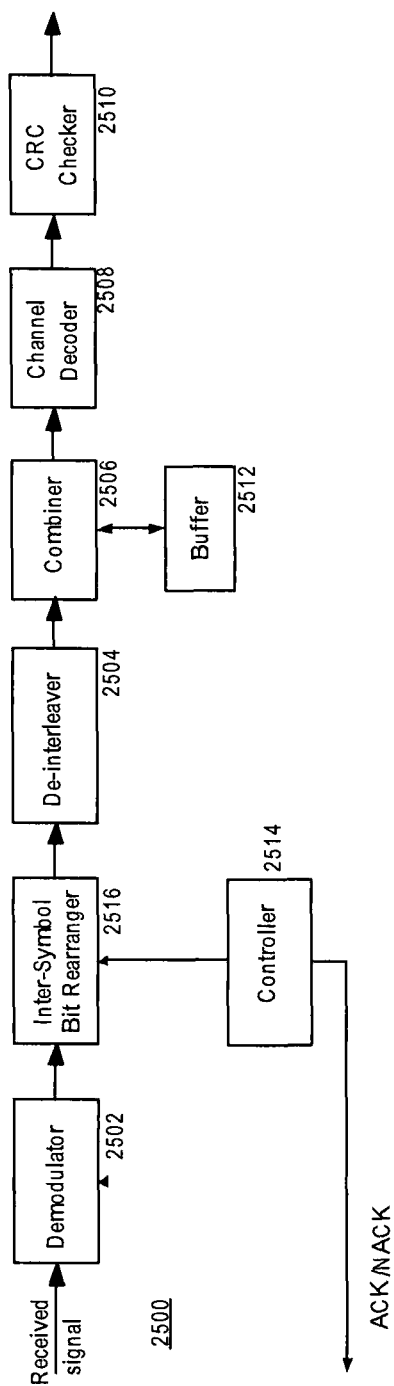
FIG. 24(b) shows portions of a receiver adapted to practice hybrid ARQ schemes according to exemplary embodiments.

Similarly, a receiver shown in FIG. 3(b) can be adapted to receive and process signals transmitted by transmitter 2400 of FIG. 24(a), such as a receiver 2500 in FIG. 24(b). Particularly, a demodulator 2502 demodulates the received signals to generate the encoded, interleaved, and punctured information bits by removing the carrier waves. A de-interleaver 2504 restores the order of the encoded bits by reversing the interleaving operation performed by channel interleaver 2406. A combiner 2506 combines multiple copies of data bits from the multiple transmissions to estimate the data bits. A channel decoder 2508 recovers the data bits and the CRC bits by removing the redundancy information added by encoder 2404. A CRC checker 2510 checks the data bits and the CRC bits for any error. If CRC checker 2510 detects an error, a negative acknowledgement (NACK) will be sent back to the transmitter to initiate a retransmission. If otherwise, then an acknowledgement (ACK) will be sent. A buffer 2512 buffers the received bits from previous transmissions so that the buffered bits can be combined by combiner 2506 with the bits received in subsequent retransmissions.

In addition, receiver 2500 also includes an inter-symbol bit rearranger 2516. Prior to de-interleaving the received bit stream, inter-symbol bit rearranger 2516 restores the order of bits and, if necessary, inverts the previously inverted bits, to generate a bit stream corresponding to the channel encoded, interleaved, and punctured bit stream introduced into inter-symbol bit rearranger 2408 in transmitter 2400 of FIG. 24(a). Inter-symbol bit rearranger 2516 also operates under the control of a controller 2514.

Controller 2514 may also control the transmission of an acknowledgement or negative acknowledgement. Controller 2514 may further control the operations of demodulator 2502, de-interleaver 2504, combiner 2506, channel decoder 2508, CRC checker 2510, and buffer 2512. Alternatively, additional controllers may be included in receiver 2500 to provide such controls.

To implement the inter-symbol bit rearrangement schemes shown in FIGS. 18(a)-18(d) and 19-21 and formulae (1)-(5), inter-symbol bit rearranger 2408 may comprise a cyclic shift register, where the encoded, interleaved, and punctured bit stream is buffered and cyclicly shifted. For each retransmission, inter-symbol bit rearranger 2408 outputs the bit stream from a specific point of the buffer corresponding to the shift value calculated according to one of formulae (1)-(5). Inter-symbol bit rearranger 2408 may also include a logical inverter

2414 for inverting particular bits. However, as noted above, the logical inversion may or may not be needed and, consequently, logical inverter 2414 may or may not be included in inter-symbol bit rearranger 2408.

If inter-symbol bit interleaving is required, the inter-symbol bit interleaving operation may be implemented in channel interleaver and puncturer 2406, such that between retransmissions, channel interleaver and puncturer 2406 is reconfigured to reflect the inter-symbol bit interleaving. In contrast, in existing systems without inter-symbol bit interleaving or inter-symbol bit rearrangement between retransmissions, the channel interleaving does not further modify the data bits from one transmission to the next transmission of the same data bits.

Alternatively, bit interleaving may be implemented in inter-symbol bit rearranger 2408. Further, channel interleaving and bit interleaving may be both combined into inter-symbol bit rearranger 2408. In such case, the transmitter and receiver need to modify the interleaving scheme between retransmissions to be able to transmit and receive the newly arranged bit stream. Thus, minimal design modification is required.

Although FIGS. 24(*a*) and 24(*b*) show block diagrams that may appear to refer to circuit blocks, it is to be understood that all or part of the functions reflected in the block diagrams can be implemented in software running on a processor.

Consistent with exemplary embodiments, there are further provided methods of adaptive modulation used with HARQ. Depending on the quality of a transmission, reducing the modulation order may reduce the error, and increasing the modulation order may increase the throughput. Exemplary embodiments provide methods for adaptively switching from one modulation scheme to another, e.g., between any two of the QPSK, 16-QAM, and 64-QAM.

FIG. 25(*a*) shows a particular example of conventional switching from 64-QAM for one transmission to 16-QAM for a retransmission. More specifically, 12 bits, $b_0, b_1, \ldots, b_{11}$, of a bit stream are grouped into two modulation symbols each containing 6 bits for modulating two quadrature carriers using the 64-QAM modulation technique. If the first transmission is received with uncorrectable error, the receiver requests a retransmission, and the transmitter transmits the same 12 bits, but now with a different modulation technique, e.g., 16-QAM. Thus, the 12 bits are now regrouped into 3 modulation symbols each containing 4 bits for modulating the two quadrature carriers. In FIG. 25(*a*), L refers to the bit positions with the lowest bit reliabilities, H refers to the bit positions with the highest bit reliabilities, and M refers to the bit positions with intermediate bit reliabilities. As FIG. 25(*a*) shows, some bits, such as $b_0, b_5, b_6$, and $b_{11}$, continue to have similar bit reliabilities from transmission to transmission.

Inter-symbol bit rearrangements may be applied in the situation of modulation modification between transmissions. FIG. 25(*b*) shows one example in which during the switch from 64-QAM to 16-QAM, the bits are rearranged such that the same bits have different bit reliabilities on retransmissions. For example, bit $b_5$ had a low bit reliability in the first transmission, but after the bit rearrangement, has a high bit reliability. As a result, the performance of the HARQ scheme is improved.

Alternatively, one may adopt an appropriate retransmission scheme, such as those shown in FIGS. 10(*a*)-10(*c*), 11(*a*)-11(*d*), 12, 13, 16, 18(*a*)-18(*d*), and 19-21 and formulae (1)-(5). For example, if the system switches from 16-QAM to 64-QAM, any of the bit arrangements shown in FIGS. 20 and 21 and formulae (3)-(5) may be used for the retransmission. If the system switches from 64-QAM to 16-QAM, any of the bit arrangements shown in FIGS. 10(*a*)-10(*c*), 11(*a*)-11(*d*), 12, 13, 16, 18(*a*)-18(*d*), and 19 and formulae (1)-(2) maybe used for the retransmission.

When adopting the retransmission schemes shown in FIGS. 18(*a*)-18(*d*) and 19-21 and formulae (1)-(5), there may not be a guarantee that the bit reliabilities will average out over transmissions. This issue can be addressed by bit interleaving, i.e., certain bits may be swapped between transmissions with different modulation schemes. A permutation table may be defined for every possible switch. For example, the following algorithm may be used to construct the bit stream for retransmissions for switches between 16-QAM and 64-QAM:

```
If m' ≠ m
    If (m'=4) & (m=6)            /* 16-QAM → 64-QAM */
        Switch ADD according to Formula (6);
        switch_lag = 1;
    Else if (m'=6) & (m=4)        /* 64-QAM → 16-QAM */
        Switch ADD according to Formula (7);
        switch_lag = 1;
If switch_lag = 1
    Permute C' according to ADD to construct C_n
``` where the modulation scheme changes from order m' to order m, C' refers to the bit stream in the initial transmission, $C_n$ refers to the bit stream to be transmitted in the next retransmission, ADD is a table defining the relative positions of the bits in six-bit groups in the initial transmission, identified as bit 1, bit 2, . . . , bit 6, and switch_lag is a flag indicating whether the permutation should take place. The texts between the signs "/*" and "*/" are comments and not part of the algorithm. Formula (6) below defines the modification of ADD from 16-QAM to 64-QAM:

$$\begin{cases} \text{bit } 4 \leftrightarrow \text{bit } 5, & \text{if } n = 2 \\ \text{bit } 5 \leftrightarrow \text{bit } 6, & \text{if } n = 3 \\ \text{bit } 1 \leftrightarrow \text{bit } 6, & \text{if } n = 4 \\ \text{bit } 1 \leftrightarrow \text{bit } 2, & \text{if } n = 5 \\ \text{bit } 2 \leftrightarrow \text{bit } 3, & \text{if } n = 0 \\ \text{bit } 3 \leftrightarrow \text{bit } 4, & \text{if } n = 1 \end{cases} \quad (6)$$

where n=TX_No mod 6, and TX_No is the index of the current transmission. Thus, for the first retransmission (n=2), bit 4 and bit 5 in the ADD table are swapped, for the third retransmission (n=4), the bit 1 and bit 6 in the ADD table are swapped, etc. The bit swapping applies to every group of six bits in the bit stream. If modulation is further modified, additional bit swapping may be applied through the ADD table, i.e., the ADD table may record the swapping operations for every modulation adaptation.

Formula (7) below defines the modification of ADD from 64-QAM to 16-QAM:

$$\begin{cases} \text{bit } 3 \leftrightarrow \text{bit } 4, & \text{if } n = 2 \\ \text{bit } 4 \leftrightarrow \text{bit } 5, & \text{if } n = 3 \\ \text{bit } 5 \leftrightarrow \text{bit } 6, & \text{if } n = 4 \\ \text{bit } 1 \leftrightarrow \text{bit } 6, & \text{if } n = 5 \\ \text{bit } 1 \leftrightarrow \text{bit } 2, & \text{if } n = 0 \\ \text{bit } 2 \leftrightarrow \text{bit } 3, & \text{if } n = 1 \end{cases} \quad (7)$$

If the formula (5) is used for 64-QAM, then formulae (6) and (7) may respectively be simplified as formulae (8) and (9) below:

$$\begin{cases} \text{bit } 4 \leftrightarrow \text{bit } 5, & \text{if } n = 2 \\ \text{bit } 5 \leftrightarrow \text{bit } 6, & \text{if } n = 3 \\ \text{bit } 1 \leftrightarrow \text{bit } 6, & \text{if } n = 0 \\ \text{bit } 3 \leftrightarrow \text{bit } 4, & \text{if } n = 1 \end{cases} \quad (8)$$

and $$\begin{cases} \text{bit } 3 \leftrightarrow \text{bit } 4, & \text{if } n = 2 \\ \text{bit } 4 \leftrightarrow \text{bit } 5, & \text{if } n = 3 \\ \text{bit } 5 \leftrightarrow \text{bit } 6, & \text{if } n = 0 \\ \text{bit } 1 \leftrightarrow \text{bit } 6, & \text{if } n = 1 \end{cases} \quad (9)$$

Figure 26:
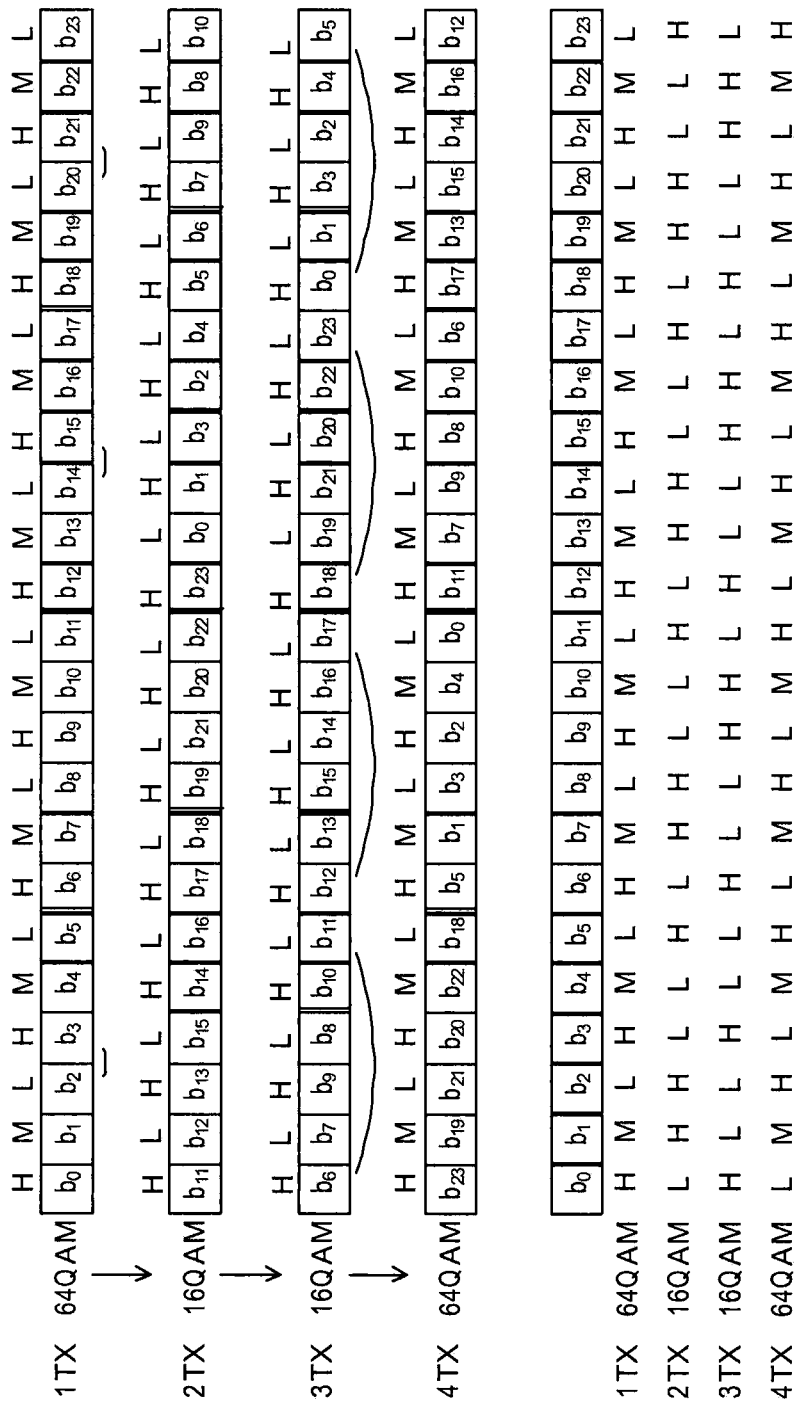
FIG. 26 illustrates an exemplary modulation switch combined with bit shifting according to exemplary embodiments.

After the bit swapping or bit interleaving, the bit shifting and inversion shown in FIGS. 18(a)-18(d) and 19-21 may be performed to achieve frequency diversity and also constellation diversity. FIG. 26 illustrates the example given above according to formulae (6) and (7) for switching between 16-QAM and 64-QAM followed by the bit shifting according to formulae (2)-(3). The top portion of FIG. 26 shows the bit arrangements for the transmissions, and the bottom portion of FIG. 26 shows the reliability of each bit in each transmission. As FIG. 26 shows, every bit in the bit stream has approximately the same average bit reliability over 4 transmissions.

Figure 27:
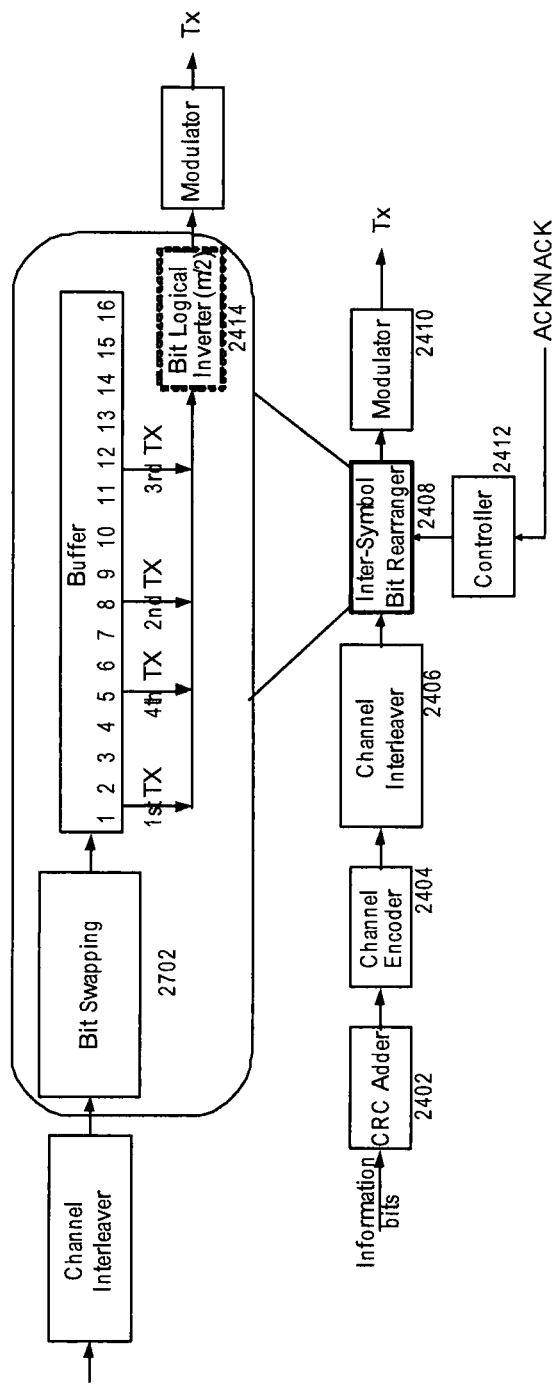
FIG. 27 illustrates an exemplary implementation of an adaptive modulation according to exemplary embodiments.

FIG. 27 illustrates one implementation of the adaptive modulation discussed above with reference to FIG. 26 and formulae (6)-(9). The same reference numbers as in FIG. 24 are used in FIG. 27 to refer to the same functional block, whether implemented in hardware or software. One additional block 2702 may be included in inter-symbol bit rearranger 2408 to perform the bit swapping discussed above in general relation to FIG. 26 and formulae (6)-(9) when the modulation scheme switches from one to another between transmissions to provide the appropriate throughput and error rate.

Figure 28:
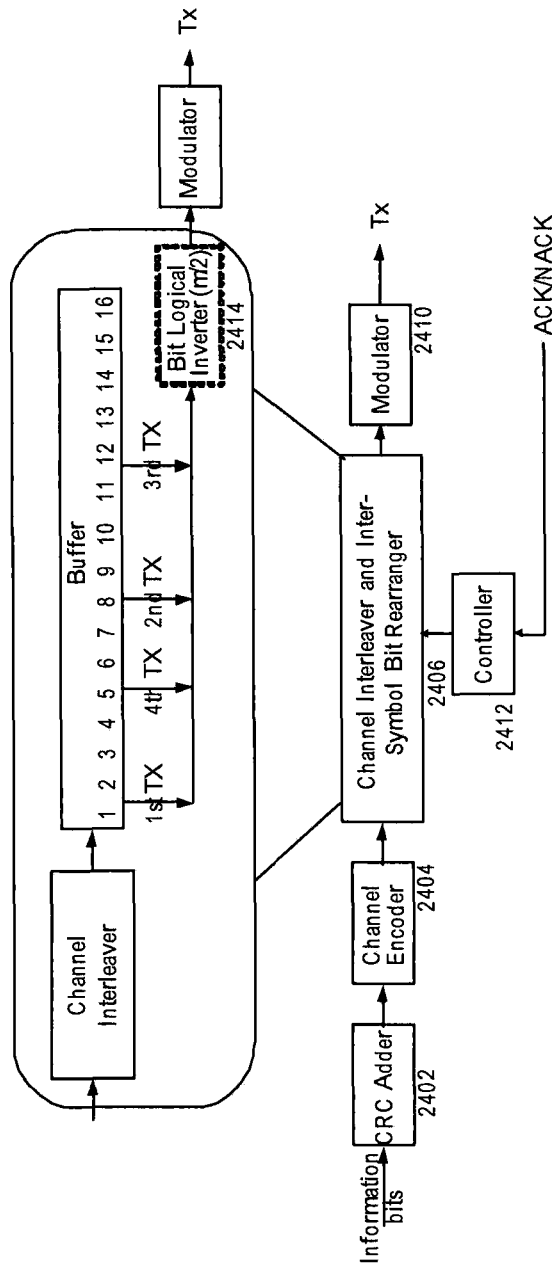
FIG. 28 illustrates an exemplary implementation of bit interleaving and bit rearrangement according to exemplary embodiments.

Alternatively, bit interleaving and inter-symbol bit rearranging may be performed in the same block, as shown in FIG. 28. One skilled in the art would understand the exemplary implementation illustrated in FIG. 28 and therefore a detailed description thereof is not included herein.

It is to be understood that the proposed bit rearrangements shown in FIG. 25(b) and formulae (6)-(9) are only examples. Embodiments of the present invention are, of course, not limited to any of these specific bit rearrangements.

The bit rearrangement or constellation rearrangement methods described above assume that data are repeated between transmissions. However, in incremental redundancy HARQ schemes, not all data are repeated. It is therefore not necessary to rearrange the bits or the constellation diagrams between transmissions for all the data in a transmission. Rather, it is effective to apply inter-symbol bit rearrangement or constellation rearrangement only to those bits representing the repeated data, while maintaining the same bit order or constellation diagram for the newly transmitted bits. Yet it is to be understood that it is equally effective to apply inter-symbol bit rearrangement or constellation rearrangement to all symbols or bits in a transmission, which may reduce complexity of implementation.

Figure 29:
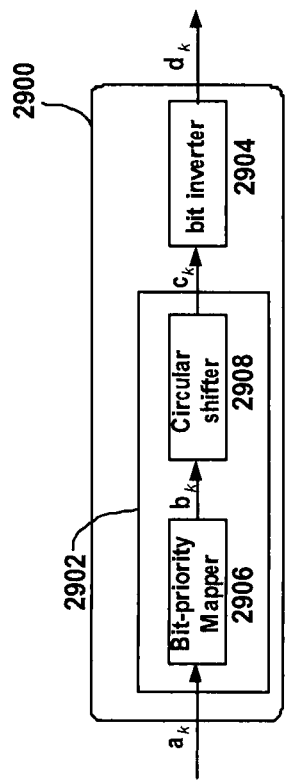
FIG. 29 illustrates an exemplary implementation of a bit rearranger according to exemplary embodiments.

Consistent with exemplary embodiments, there is also provided bit rearrangers that assign bit priorities based on bit significance and rearrange the bits in a bit stream based on the bit priorities. FIG. 29 illustrates such a bit rearranger at a high level.

As shown in FIG. 29, a bit rearranger 2900 includes a bit interleaver 2902 and a bit inverter 2904. Bit interleaver 2902 further includes a bit priority mapper 2906 and a circular shifter 2908. Bit priority mapper 2906 accepts a stream of bits $a_k$, assigns different priorities to the stream of bits, and creates a new sequence $b_k$ by mapping or rearranging the bits of $a_k$ based on their respective priorities. The mapping of the bits in $a_k$ to the bits in $b_k$ depends on the modulation scheme and carrier configuration. For example, a low priority bit in $a_k$ may be mapped to the second bit in $b_k$ if 16-QAM modulation is used and the second bit in $b_k$ has a low reliability, but the same bit may be mapped to the third bit in $b_k$ if 64-QAM modulation is used and the third bit in $b_k$ has a low reliability. Circular shifter 2908 may provide shifts of the bit stream $b_k$ to generate a new stream $c_k$ for retransmission. The shifts may be such that a high priority bit gets retransmitted still in a position with high reliability, thereby enhancing the reliable reception of that bit, or that a high priority bit and a low priority bit switch positions with respect to the transmission reliabilities, thereby averaging out the reliabilities of the bits. Bit inverter 2904 provides additional diversity by logically inverting certain bits on a retransmission to generate a new stream $d_k$.

Figure 30:
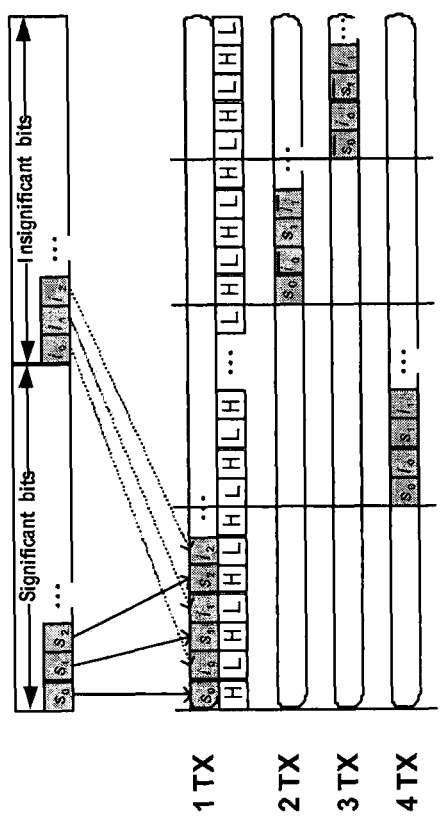
FIG. 30 shows exemplary bit rearrangements according to exemplary embodiments.

FIG. 30 illustrates a bit rearrangement scheme, to be used in connection with 16-QAM modulation scheme, that may be implemented in bit rearranger 2900 of FIG. 29. In particular, a bit stream includes bits $s_0, s_1, s_2, \ldots i_0, i_1, i_2, \ldots$, where $s_0, s_1, s_2, \ldots$ are significant bits and $i_0, i_1, i_2, \ldots$ are insignificant bits, and $s_0, s_1, s_2, \ldots$ have higher priorities than $i_0, i_1, i_2, \ldots$. The relative priorities of $s_0, s_1, s_2, \ldots, i_0, i_1, i_2, \ldots$ are determined based on their relative significance, such as whether the bits are systemic bits or parity bits, whether the bits correspond to more/less important information, etc. For example, in chase combining HARQ, systemic bits may be given higher priority than parity bits, while in incremental redundancy HARQ, additional redundancy bits not transmitted before are given higher priority than those in the previous transmissions.

Based on their relative priorities, the bits may be mapped, for example, at bit priority mapper 2906, to different positions in a new bit stream. In particular, the significant bits $s_0, s_1, s_2, \ldots$, may be mapped to the high priority bit positions, and the insignificant bits $i_0, i_1, i_2, \ldots$, may be mapped to the low priority bit positions, resulting in a bit stream $s_0, i_0, s_1, i_1, s_2, i_2, \ldots$. This new bit stream will then be transmitted, providing better reliability for the significant bits $s_0, s_1, s_2, \ldots$ than the insignificant bits $i_0, i_1, i_2, \ldots$.

During retransmissions, the reliabilities of the significant bits may be enhanced by transmitting the significant bits again at high reliability bit positions or may be averaged by shifting the significant bits to low reliability bit positions. For example, FIG. 30 shows that for the second transmission (2TX), i.e., the first retransmission, the bit stream $s_0, i_0, s_1, i_1, s_2, i_2, \ldots$ is shifted, for example, at circular shifter 2908, by an amount such that the significant bits $s_0, s_1, s_2, \ldots$ are still transmitted at the high reliability bit positions, and the insignificant bits $i_0, i_1, i_2, \ldots$ are still transmitted at the low reliability bit positions, as a result of which the reliabilities of the significant bits are greatly enhanced.

FIG. 30 also shows that for the third transmission (3TX), i.e., the second retransmission, the bit stream is shifted by an amount such that the significant bits are transmitted at the low reliability bit positions, while the insignificant bits are now transmitted at the high reliability positions, as a result of which the insignificant bits are more likely to be correctly received.

FIG. 30 further shows that for the fourth transmission (4TX), i.e., the third retransmission, the bit stream is shifted by an amount such that the significant bits are still transmitted at the low reliability bit positions, while the insignificant bits are still transmitted at the high reliability positions. After the four transmissions shown in FIG. 30, the reliabilities of the significant bits and insignificant bits are averaged out.

Figure 31:
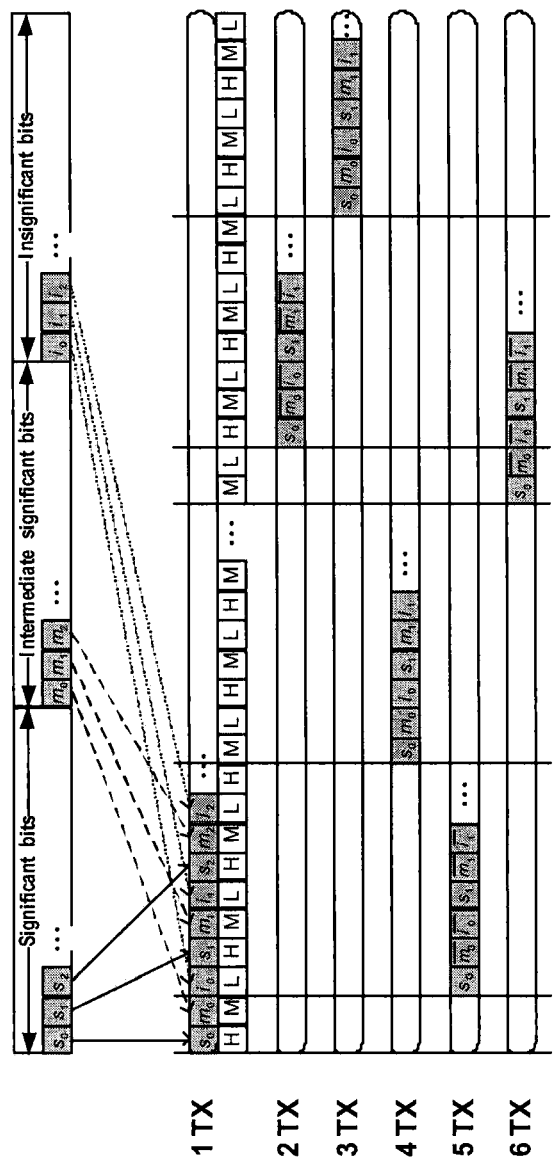
FIG. 31 shows exemplary bit rearrangements according to exemplary embodiments.

FIG. 31 illustrates a bit rearrangement scheme for 64-QAM modulation. Because each modulation symbol includes 6 bits, 3 of which modulate one of the in-phase and quadrature carriers, the input stream of bits may be assigned three levels of significance or priorities, including significant or high priority bits $s_0, s_1, s_2, \ldots$, insignificant or low priority bits $i_0, i_1, i_2, \ldots$, and intermediate priority bits $m_0, m_1, m_2, \ldots$. Then, the bits of the three different levels of significance are mapped to high ("H"), medium ("M"), and low ("L") reliability bit positions, respectively to form a new bit stream for the initial transmission (1TX).

For retransmissions, the bit stream is shifted by such amounts as to enhance the bit reliabilities or average out the bit reliabilities. In particular, referring to FIG. 31, the second transmission (2TX) enhances the bit reliabilities of the first transmission (1TX) as the bits are transmitted at bit positions with the same bit reliabilities. For the third through sixth transmissions (3TX-6TX), however, the bit stream is shifted by such amounts such that the bit reliabilities change between transmissions, thereby averaging out the bit reliabilities over the bit stream. One skilled in the art would now understand FIG. 31, and therefore a detailed explanation is not provided herein.

The amount of shift of the bit stream for each retransmission may depend on the system configuration aspects such as the modulation scheme, whether the system uses OFDM with multiple subcarriers. For example, FIGS. 30 and 31 illustrate the impact of the modulation scheme, i.e., 16-QAM or 64-QAM, on the shift between transmissions. FIGS. 32(a)-32(d) may be referred to for illustrating the application of the bit rearrangement scheme in OFDM systems with multiple carriers.

FIGS. 32(a), 32(c), and 32(d) show the allocation of resource units (RU) in an OFDM system such as the one defined by the IEEE 802.16m standards. In particular, the subcarriers are divided into groups, each group containing, e.g., 18 subcarriers, shown as the rows in the table in FIG. 32(a). Each subcarrier carries information bits through a certain modulation scheme, such as 16-QAM or 64-QAM. For example, if 64-QAM is used, then each subcarrier can carry 6-bit symbols, with three bits of each symbol modulating one of the in-phase and quadrature carriers and the other three bits modulating the other one of the in-phase and quadrature carriers. The symbols simultaneously transmitted on all the subcarriers within a group form an OFDM symbol. An RU consists of a number of OFDM symbols. Particularly as shown in FIG. 32(a), each RU contains six (6) OFDM symbols and 18 modulation symbols respectively carried by the 18 subcarriers in each OFDM symbol. With a 64-QAM modulation scheme, each RU may contain 18×6×6=648 bits.

The solid boxes in FIG. 32(a) indicate pilot signals transmitted on certain subcarriers in certain OFDM symbols. In particular, pilot signals are transmitted on subcarrier 0 in the first OFDM symbol, subcarrier 16 in the second OFDM symbol, subcarrier 8 in the third OFDM symbol, etc. One skilled in the art should understand that pilot signals are predefined signal patterns transmitted with real data signals for facilitating reception and detection of the real data signals.

The capacity of an RU is also measured in "tones," which refer to the number of modulation symbols. For example, in the example shown in FIG. 32(a), an RU has 18×6=108 tones, including 6 pilot tones and 102 data tones.

Consistent with exemplary embodiments, a stream of data bits to be transmitted are first assigned priorities based on their respective significances. A bit stream is created by mapping the data bits onto the modulation symbols carried by the subcarriers such that the significance of each data bit corresponds to the bit reliability of the mapped position of that data bit in a modulation symbol. For example, a significant data bit may be mapped to the most reliable bit position with a modulation symbol, while an insignificant data bit may be mapped to the least reliable bit position. The data bits are assigned to the modulation symbols within an OFDM symbol in a determined order of subcarriers, e.g., subcarrier 0, subcarrier 1, . . . subcarrier 17, and also in a determined order of OFDM symbols, e.g., OFDM symbol 0, OFDM symbol 1, . . . , OFDM symbol 5. Thus, referring to FIG. 32(a), assuming there are 198 data bits to send using 64-QAM modulation, the first 102 bits together with the pilot bits on subcarrier 0 will form OFDM symbol 0, and the remaining 96 bits together with the pilot bits on subcarrier 16 will form part of OFDM symbol 1, and so on. Once an RU of 6 OFDM symbols has been filled, additional data bits are assigned to the next RU in the same manner.

After the first transmission, a retransmission may be formed by rearranging the data bits within the modulation symbols, between subcarriers within an OFDM symbol, or between the OFDM symbols. For example, bit interleaver 2902 and bit inverter 2904 of FIG. 29 may be used to rearrange the data bits for retransmissions.

As an example, FIG. 32(b) illustrates retransmissions formed by circularly shifting the data bits through the OFDM symbols. FIG. 32(b) shows three radio units (RUs) including 255 modulation symbols. The second transmission (2TX, or the first retransmission) is formed by shifting the data bits by 24 subcarriers (not including the subcarrier carrying the pilot signal) with respect to the first transmission, the third transmission (3TX, or the second retransmission) is formed by shifting the data bits by 36 subcarriers (not including the subcarrier carrying the pilot signal) with respect to the first transmission, and the fourth transmission (4TX, or the third retransmission) is formed by shifting the data bits by 12 subcarriers with respect to the first transmission. The shifts are circular. Therefore, the data bits that were transmitted on subcarrier 1 in OFDM symbol 0 will be transmitted on subcarrier 26 in OFDM symbol 0 in the second transmission, on subcarrier 39 in OFDM symbol 0 in the third transmission, and on subcarrier 13 in OFDM symbol 0 in the fourth transmission. In addition, the data bits may be shifted by an additional number of bits such that the relative bit position within the modulation symbols changes from transmission to transmission. For example, assuming 16-QAM modulation, for the second transmission, the data bits may be further shifted by, in addition to the amount of 24 subcarriers, two additional bits, such that a bit modulating the in-phase carrier wave of subcarrier 1 in the first transmission now modulates the quadrature carrier wave of subcarrier 26.

The circular shift may be implemented in, for example, circular shifter 2908. Because of the manner in which data bits are mapped into the OFDM symbols, to realize the shift of 24 subcarriers and 2 additional bits between the first transmission and second transmission, while maintaining the relative OFDM symbol position, circular shifter 2908 actually shifts the data bits by an amount of 438 bits, which is calculated as follows:

(17 tones/*OFDM* symbol×6 *OFDM* symbols/*RU*×1 *RU*+7 tones)×4 bits/tone+2 additional bits=438 bits.

Although each RU uses 18 subcarriers, each OFDM symbol only uses 17 of the 18 subcarriers to carry data bits and the other subcarrier for pilot signal.

Similarly, if the third transmission is formed by shifting the data bits by 36 subcarriers plus an additional bit, then the total amount of shift will be 825 bits (=206 tones×4 bits/tone+1). If the fourth transmission is formed by shifting the data bits by 12 subcarriers plus an additional bit, then the total amount of shift will be 49 bits (=12 tones×4 bits/tone+1).

FIGS. 32(a) and 32(b) only illustrate the case of a single bit stream. However, multiple bit streams may be transmitted at the same time, with the data bits in the multiple bits streams occupying different tones in the RU. For example, FIG. 32(c) illustrates the case of two bit streams being transmitted at the same time, and FIG. 32(d) illustrates the case of four bit streams being transmitted at the same time. As shown in FIG. 32(c), two pilot signals, labeled "P1" and "P2," respectively for the two bit streams are transmitted in each OFDM symbol. As shown in FIG. 32(d), four pilot signals, labeled "P1," "P2," "P3," and "P4," respectively for the four bit streams are transmitted. The data tones in each RU can then be allocated among the multiple bit streams.

Consistent with exemplary embodiments, there is provided an algorithm for constructing retransmission bit streams as follows:

```
for i = 0, 1, ..., L_k - 1
    j = floor(2i / m_k) + 2L_k / m_k · (i mod(m_k / 2));
    if ((N_CMS / N_str)mod N_DT) < N_DT / 2
        s_0 = floor(N_CMS / N_str / N_DT) · L_scd;
        if s_0 == 0 s_0 = L_scd;
    else
        s_0 = ceil(N_CMS / N_str / N_DT) · L_scd;
    s_1 = floor(s_0 · q_1 / 4 / L_scd);
    s_2 = floor(s_0 · q_1 / 4)mod L_scd;
    N_shift = (s_1 · N_DT · m_k + s_2 · m_k) · N_str + q_2;
    ADD(i) = (L_k - N_shift + j)mod L_k;
    if CC-HARQ
        if m_k == 4
            if N_TX mod 4 == 1 or 2
                c_i = a_ADD(i) ⊕ (i mod 2);
        esle if m_k == 6
            if N_TX mod 4 == 1
                c_i = a_ADD(i) ⊕ floor(((i mod 3) + 1) / 2);
        esle
            c_i = a_ADD(i);
    if IR-HARQ
        if (m_k == 4) & (R==1 / 2)
            if N_TX mod 4 == 3
                c_i = a_ADD(i) ⊕ (i mod 2);
        esle if (m_k == 6) & (R==1 / 2)
            if N_TX mod 4 == 3
                c_i = a_ADD(i) ⊕ floor(((i mod 3) + 1) / 2);
        esle
            c_i = a_ADD(i);
```

In the above algorithm:

$N_{DT}$ is the number of data tones per RU;

$m_k$ is the modulation order (2 for QPSK, 4 for 16-QAM, 6 for 64-QAM);

$L_k$ is the number of coded bits in packet k;

$N_{CMS}=L_k/m_k$ is the number of modulation symbols of packet k;

$N_{str}$ is the number of streams; and $L_{scd}$ is the number of subcarriers used for data (17 if $N_{str}=1$, 16 if $N_{sr}=2$, etc.).

Table 4 below gives exemplary values of $q_1$ and $q_2$ used in the algorithm above for chase combining HARQ.

TABLE 4

| Modulation | $N_{TX}$ mod 4 | $q_1$ | $q_2$ | Invert pattern |
|---|---|---|---|---|
| QPSK | 0 | 0 | 0 | None |
|  | 1 | 2 | 2 | None |
|  | 2 | 3 | 0 | None |
|  | 3 | 1 | 2 | None |
| 16-QAM | 0 | 0 | 0 | None |
|  | 1 | 2 | 2 | [0 1] |
|  | 2 | 3 | 1 | [0 1] |
|  | 3 | 1 | 1 | None |
| 64-QAM | 0 | 0 | 0 | None |
|  | 1 | 2 | 3 | [0 1 1] |
|  | 2 | 3 | 2 | None |
|  | 3 | 1 | 1 | None |

For example, for 16-QAM, the third transmission ($N_{TX}$ mod 4=2), $q_1$=3 and $q_2$=1. In addition, every other bit will be inverted as indicated by the invert pattern [0 1]. In contrast, the fourth transmission ($N_{TX}$ mod 4=3), $q_1$=1, $q_2$=1, and no bit inversion is needed.

Table 5 below gives exemplary values of $q_1$ and $q_2$ used in the algorithm above for incremental redundancy HARQ.

TABLE 5

| Modulation | HARQ mode | $N_{TX}$ mod 4 | $q_1$ | $q_2$ | Invert pattern |
|---|---|---|---|---|---|
| QPSK | IR-HARQ | 0 | 0 | 0 | None |
|  |  | 1 | 2 | 2 | None |
|  |  | 2 | 3 | 0 | None |
|  |  | 3 | 1 | 2 | None |
| 16-QAM | IR-HARQ R = ½ | 0 | 0 | 0 | None |
|  |  | 1 | 2 | 4 | None |
|  |  | 2 | 3 | 0 | None |
|  |  | 3 | 1 | 2 | [0 1] |
|  | IR-HARQ R = ⅔ | 0 | 0 | 0 | None |
|  |  | 1 | 1 | 4 | None |
|  |  | 2 | 2 | 5 | None |
|  |  | 3 | 3 | 1 | None |
|  | IR-HARQ R = ¾ | 0 | 0 | 0 | None |
|  |  | 1 | 1 | 4 | None |
|  |  | 2 | 2 | 4 | None |
|  |  | 3 | 3 | 2 | None |
| 64-QAM | IR-HARQ R = ½ | 0 | 0 | 0 | None |
|  |  | 1 | 2 | 6 | None |
|  |  | 2 | 3 | 0 | None |
|  |  | 3 | 1 | 3 | [0 1 1] |
|  | IR-HARQ R = ⅔ | 0 | 0 | 0 | None |
|  |  | 1 | 1 | 6 | None |
|  |  | 2 | 2 | 8 | None |
|  |  | 3 | 3 | 1 | None |
|  | IR-HARQ R = ¾ | 0 | 0 | 0 | None |
|  |  | 1 | 1 | 6 | None |
|  |  | 2 | 2 | 3 | None |
|  |  | 3 | 3 | 0 | None |

One skilled in the art should now understand Table 5 and detailed explanation thereof is not provided herewith.

In the above descriptions in connection with FIGS. 29, 30, 31, and 32(a)-32(d) and Tables 4 and 5, it was assumed that the data bits are first prioritized and mapped onto their respective bit positions based on their relative significance to form a bit stream. This bit stream then goes through bit rearrangement, e.g., bit shifting and/or inversion to construct each retransmission. However, it is to be understood that the bit prioritization, bit mapping, and bit rearrangement may be implemented in any order. For example, bit rearrangement may occur prior to bit mapping. One skilled in the art should now appreciate that these different orders of processing can easily be implemented in computerized environments.

Additionally, bit rearrangement may also be applied in systems that provide space diversity to improve such space diversity. For example, in a multiple-input-multiple-output (MIMO) system, multiple antennas are used to transmit data streams. Bit rearrangement may be used such that certain data bits are transmitted on different antennas between retransmissions. The bit rearrangement across multiple antennas may be on the basis of data bits, modulation symbols, carriers, OFDM symbols, etc. For example, the bits in a modulation symbol may form different modulation symbols in a retransmission, some of the different modulation being transmitted over a different antenna. Alternatively, a modulation symbol may comprise the same data bits but is transmitted over different antennas between retransmissions.

Such bit rearrangements may be further combined with any of the other bit rearrangement schemes described herein. For example, in a MIMO system that uses 16-QAM modulation, data bits may be rearranged such that not only some bits are transmitted on different antennas between retransmissions, but some bits also modulate different carriers (i.e., in-phase carrier vs. quadrature carrier) between retransmissions. One of ordinary skill in the art should now understand such modifications of the bit rearrangement techniques and detailed explanations are not provided herein.

The exemplary embodiments described herein use as examples binary representation of data and illustrate specific examples of bit arrangements. It is to be understood that the present invention is not limited to any of such specific examples. One skilled in the art should now be able to modify the examples without departing from the spirit of the invention.

It will be apparent to those skilled in the art that various modifications and variations can be made in the disclosed embodiments without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of error control, comprising:
   forming a plurality of first data symbols from a plurality of data bits;
   transmitting a first signal including the plurality of first data symbols;
   receiving a request for retransmission;
   forming a plurality of second data symbols from the plurality of data bits; and
   transmitting a second signal including the plurality of second data symbols,
   wherein
   the plurality of second data symbols are formed from all of the same data bits of the plurality of data bits as the plurality of first data symbols,
   at least one of the first data symbols is formed from several of the plurality of data bits such that none of the second data symbols is formed from the same several of the plurality of data bits,
   a first half of a plurality of bits in each of the plurality of first data symbols and second data symbols are mapped to an in-phase carrier, and
   a second half of the plurality of bits in each of the plurality of first data symbols and second data symbols are mapped to a quadrature carrier.

2. The method of claim 1, wherein the first signal further includes a plurality of third data symbols, and the second signal further includes a plurality of fourth data symbols, the third data symbols and the fourth data symbols representing different data.

3. The method of claim 1, wherein forming the plurality of second data symbols comprises interleaving the plurality of data bits.

4. The method of claim 1, wherein forming the plurality of second data symbols comprises logically inverting at least one of the plurality of data bits.

5. The method of claim 1, wherein forming the plurality of second data symbols comprises shifting each of the plurality of data bits by a respective predetermined shift amount.

6. The method of claim 1, wherein the plurality of data bits are grouped into bit units each including a number of bits and each for modulating a respective one of an in-phase carrier wave and a quadrature carrier wave, wherein forming the plurality of second data symbols from the plurality of data bits comprises rearranging the bit units.

7. The method of claim 1, wherein both the plurality of first data symbols and the plurality of second data symbols modulate a plurality of orthogonal frequency subcarriers in an orthogonal frequency division multiplexing system, each frequency subcarrier being modulated by a number of data bits, and wherein forming the plurality of second data symbols comprises cyclically shifting the plurality of data bits by a number of bits that is not an integer multiple of the number of data bits modulating each frequency subcarrier.

8. The method of claim 1, further comprising determining a significance of each of the plurality of data bits, wherein forming the plurality of first data symbols comprises determining a position of each of the plurality of data bits in the first signal based on the significance of the corresponding data bit.

9. The method of claim 1, wherein at least one of the plurality of data bits is transmitted over a first antenna in the first signal and over a second antenna in the second signal.

10. An apparatus having circuit blocks, the circuit blocks comprising:
    an encoder to encode information bits to form a set of encoded bits;
    a bit rearranger to arrange the set of encoded bits to form a first bit stream to be transmitted; and
    a controller to determine if a transmission of the first bit stream is successfully received,
    wherein
    the bit rearranger rearranges the set of encoded bits to form a second bit stream to be transmitted if the transmission of the first bit stream is not successfully received,
    the first bit stream has a plurality of first data symbols,
    the second bit stream has a plurality of second data symbols,
    the plurality of second data symbols are formed from all of the same encoded bits of the set of encoded bits as the plurality of first data symbols,
    at least one of the first data symbols is formed from several of the set of encoded bits such that none of the second data symbols is formed from the same several of the set of encoded bits,
    a first half of a plurality of bits in each of the plurality of first data symbols and second data symbols are mapped to an in-phase carrier, and
    a second half of the plurality of bits in each of the plurality of first data symbols and second data symbols are mapped to a quadrature carrier.

11. The apparatus of claim 10, wherein the bit rearranger interleaves the set of encoded bits to form the second bit stream.

12. The apparatus of claim 10, wherein the bit rearranger logically inverts at least one of the set of encoded bits to form the second bit stream.

13. The apparatus of claim 10, wherein the bit rearranger shifts each of the plurality of data bits by a respective predetermined shift amount to form the second bit stream.

14. The apparatus of claim 10, wherein the set of encoded bits are grouped into bit units each including a number of bits and each for modulating a respective one of an in-phase carrier wave and a quadrature carrier wave, wherein the bit rearranger rearranges the bit units.

15. The apparatus of claim 10, wherein both the plurality of first data symbols and the plurality of second data symbols modulate a plurality of orthogonal frequency subcarriers in an orthogonal frequency division multiplexing system, each frequency subcarrier being modulated by a number of data bits, and wherein the bit rearranger cyclically shifts the plurality of data bits by a number of bits that is not an integer multiple of the number of data bits modulating each frequency subcarrier.

16. The apparatus of claim 10, wherein the bit rearranger comprises a bit priority mapper for determining a significance of each of the set of encoded bits and for determining a position of each of the set of coded bits in the first bit stream based on the significance of a corresponding bit.

17. The apparatus of claim 16, the bit priority mapper further for determining a position of each of the set of encoded bits in the second bit stream based on a significance of a corresponding bit.

18. The apparatus of claim 10, wherein the bit rearranger comprises a circular shifter for shifting positions of the set of encoded bits in the first bit stream to form the second bit stream.

19. The apparatus of claim 10, wherein at least one of the encoded bits is transmitted over a first antenna in the first bit stream and over a second antenna in the second bit stream.

20. An apparatus, comprising:
a receiver to receive a first signal and a second signal from a transmitter, wherein the first signal includes carrier waves modulated with a first bit stream including a plurality of first data symbols, and the second signal includes carrier waves modulated with a second bit stream including a plurality of second data symbols, wherein the first and second data symbols are formed from the same data bits, wherein at least one of the first data symbols is formed from several of the same data bits such that none of the second data symbols is formed from the several of the same data bits, wherein a first half of a plurality of bits in each of the plurality of first data symbols and second data symbols are mapped to an in-phase carrier, and wherein a second half of the plurality of bits in each of the plurality of first data symbols and second data symbols are mapped to a quadrature carrier;
a bit rearranger to rearrange the bits in the first and second bit streams;
a storage device to store the rearranged bits in the first and second bit streams; and
a combiner to combine the rearranged bits in the first and second bit streams.

21. The apparatus of claim 20, wherein the receiver is configured to receive the first signal including the first bit stream and a third bit stream and to receive the second signal including the second bit stream and a fourth bit stream, wherein the third and fourth bit streams represent different data.

22. The apparatus of claim 20, wherein the bit rearranger interleaves the bits in the second bit stream.

23. The apparatus of claim 20, wherein the bit rearranger logically inverts at least one of the bits in the second bit stream.

24. The apparatus of claim 20, wherein the bit rearranger shifts each of the bits in the second bit stream by a respective predetermined shift amount.

25. A method of adaptive modulation, comprising: forming a plurality of first data symbols from a plurality of data bits;
modulating carrier waves with the plurality of first data symbols according to a first modulation scheme;
transmitting first signals including the carrier waves modulated with the plurality of first data symbols;
receiving a request for retransmission;
forming a plurality of second data symbols from the plurality of data bits;
modulating the carrier waves with the plurality of second data symbols according to a second modulation scheme different from the first modulation scheme; and
transmitting second signals including the carrier waves modulated with the
plurality of second data symbols, wherein the plurality of second data symbols are formed from all of the same data bits of the plurality of data bits as the plurality of first data symbols,
forming the plurality of second data symbols includes modifying the sequence of the plurality of data bits by swapping predetermined ones of the plurality of data bits and cyclically shifting all of the plurality of data bits by a predetermined number of bits.

26. An apparatus, comprising: an encoder to encode information bits to form a set of encoded bits;
a bit rearranger to arrange the set of encoded bits to form a first bit stream to be transmitted;
a modulator to modulate a carrier wave; and
a controller to determine if a transmission of the first bit stream is successfully received,
wherein the bit rearranger modifies the sequence of the set of encoded bits by swapping predetermined ones of the plurality of encoded bits and cyclically shifting all of the plurality of encoded bits by a predetermined number of encoded bits to form a second bit stream to be transmitted if the transmission of the first bit stream is not successfully received,
the first bit stream has a plurality of first data symbols, the second bit stream has a plurality of second data symbols,
the plurality of second data symbols are formed from all of the same encoded bits of the set of encoded bits as the plurality of first data symbols, and
the modulator modulates the carrier wave with the plurality of first data symbols according to a first modulation scheme and modulates the carrier wave with the plurality of second data symbols according a second modulation scheme different from the first modulation scheme.

27. The method of claim 1, wherein each data bit of the plurality of data bits is modulated using a same modulation scheme when forming the plurality of first data symbols and when forming the plurality of second data symbols.

28. The apparatus of claim 10, wherein each encoded bit of the plurality of encoded bits is modulated using a same modulation scheme when forming the plurality of first data symbols and when forming the plurality of second data symbols.

29. The apparatus of claim 20, wherein each data bit is modulated using a same modulation scheme when forming the plurality of first data symbols and when forming the plurality of second data symbols.

30. A method of adaptive modulation, comprising:
forming a plurality of first data symbols from a plurality of data bits;
modulating carrier waves with the plurality of first data symbols according to a first modulation scheme;
transmitting first signals including the carrier waves modulated with the plurality of first data symbols;
receiving a request for retransmission;
forming a plurality of second data symbols from the plurality of data bits;
modulating the carrier waves with the plurality of second data symbols according to a second modulation scheme different from the first modulation scheme; and
transmitting second signals including the carrier waves modulated with the plurality of second data symbols,
wherein
when one of the plurality of first data symbols or the plurality of second data symbols uses a 64-QAM modulation scheme, and the other one of the plurality of first data symbols or the plurality of second data symbols uses a 16-QAM modulation scheme, forming the plurality of second data symbols includes modifying the sequence of the plurality of data bits by swapping first and sixth bits per six bits of the plurality of first data symbols.

31. An apparatus, comprising:
an encoder to encode information bits to form a set of encoded bits;
a bit rearranger to arrange the set of encoded bits to form a first bit stream to be transmitted;
a modulator to modulate a carrier wave; and
a controller to determine if a transmission of the first bit stream is successfully received,
wherein
the bit rearranger modifies the sequence of the set of encoded bits to form a second bit stream to be transmitted if the transmission of the first bit stream is not successfully received,
the first bit stream has a plurality of first data symbols,
the second bit stream has a plurality of second data symbols,
the modulator modulates the carrier wave with the plurality of first data symbols according to a first modulation scheme and modulates the carrier wave with the plurality of second data symbols according a second modulation scheme different from the first modulation scheme, and
when one of the plurality of first data symbols or the plurality of second data symbols uses a 64-QAM modulation scheme, and the other one of the plurality of first data symbols or the plurality of second data symbols uses a 16-QAM modulation scheme, first and sixth bits per six bits of the plurality of first data symbols are swapped to form the second bit stream.

* * * * *

UNITED STATES PATENT AND TRADEMARK OFFICE
CERTIFICATE OF CORRECTION

PATENT NO. : 8,677,204 B2
APPLICATION NO. : 12/434868
DATED : March 18, 2014
INVENTOR(S) : Yu-Chuan Fang et al.

Page 1 of 1

It is certified that error appears in the above-identified patent and that said Letters Patent is hereby corrected as shown below:

In the Claims

Claim 26, Col. 30, Line 54, "according a" should read as --according to a--.

Claim 31, Col. 32, Line 17, "according a" should read as --according to a--.

Signed and Sealed this
Nineteenth Day of August, 2014

Michelle K. Lee
*Deputy Director of the United States Patent and Trademark Office*